United States Patent

Ohmi et al.

[11] Patent Number: 5,956,194
[45] Date of Patent: Sep. 21, 1999

[54] DATA STORAGE APPARATUS

[75] Inventors: Takao Ohmi, Kamakura; Tomoko Taguchi, Kawasaki; Shinji Takakura, Kawasaki; Takehito Yamada, Kawasaki; Masayuki Sekimura, Tokyo, all of Japan

[73] Assignee: Kabushiki Kaisha Toshiba, Kawasaki, Japan

[21] Appl. No.: 08/933,866

[22] Filed: Sep. 19, 1997

Related U.S. Application Data

[63] Continuation of application No. 08/460,774, Jun. 2, 1995, abandoned.

[30] Foreign Application Priority Data

Sep. 16, 1994 [JP] Japan ................................. 6-221329
Mar. 23, 1995 [JP] Japan ................................. 7-088624

[51] Int. Cl.⁶ .................................................. G11B 15/04
[52] U.S. Cl. .............................. 360/60; 711/164; 360/69
[58] Field of Search .................................. 360/69, 71, 60; 380/3, 4, 5; 711/163, 164, 100

[56] References Cited

U.S. PATENT DOCUMENTS

| | | |
|---|---|---|
| 4,825,050 | 4/1989 | Griffith et al. ........................ 235/379 |
| 5,070,479 | 12/1991 | Nakagawa .............................. 395/575 |
| 5,107,400 | 4/1992 | Kobayashi ............................. 361/392 |
| 5,280,398 | 1/1994 | Wade et al. ............................. 360/60 |
| 5,321,817 | 6/1994 | Feinstein .............................. 395/325 |
| 5,379,433 | 1/1995 | Yamagishi ............................ 360/60 X |
| 5,450,489 | 9/1995 | Ostrover et al. ...................... 360/60 X |
| 5,457,668 | 10/1995 | Hibino et al. .......................... 369/32 |
| 5,784,460 | 7/1998 | Blumenthal et al. ..................... 380/4 |
| 5,788,421 | 7/1998 | Nagano et al. ......................... 711/115 |

FOREIGN PATENT DOCUMENTS

| | | |
|---|---|---|
| 54-53509 | 4/1979 | Japan . |
| 2-165477 | 6/1990 | Japan . |
| 5-143247 | 6/1993 | Japan . |

*Primary Examiner*—Andrew L. Sniezek
*Attorney, Agent, or Firm*—Finnegan, Henderson, Farabow, Garrett & Dunner, L.L.P.

[57] ABSTRACT

A data storage apparatus (HDD unit) having a cartridge, attachable to and detachable from a personal computer, incorporating a recording disk, comprises a switch circuit for inhibiting data reading and writing with respect to a magnetic disk and a locking mechanism for detecting that the cartridge is detached from the personal computer and causing a data reading and writing inhibiting device to operate in response to the detection.

34 Claims, 24 Drawing Sheets

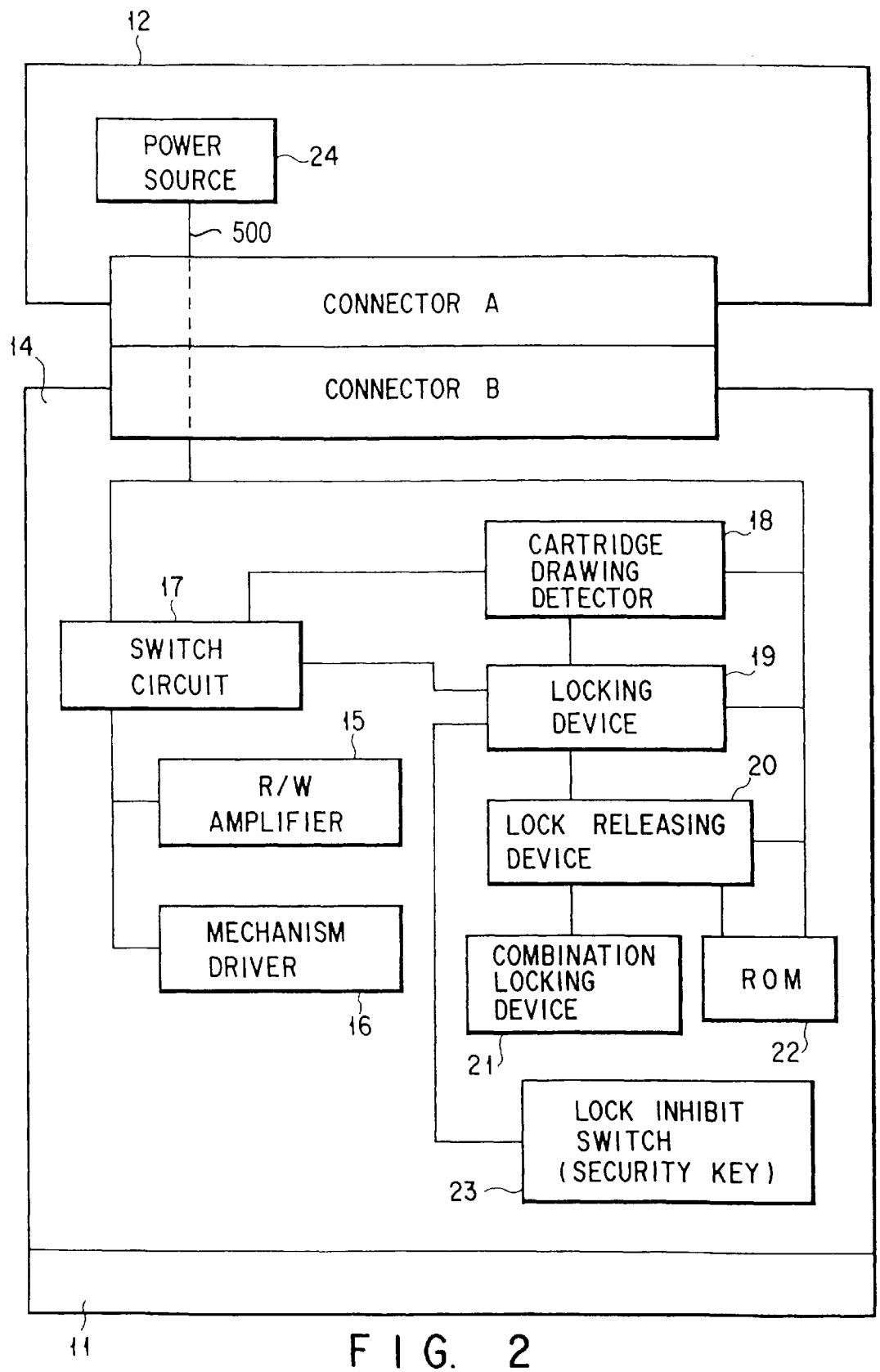
F I G. 2

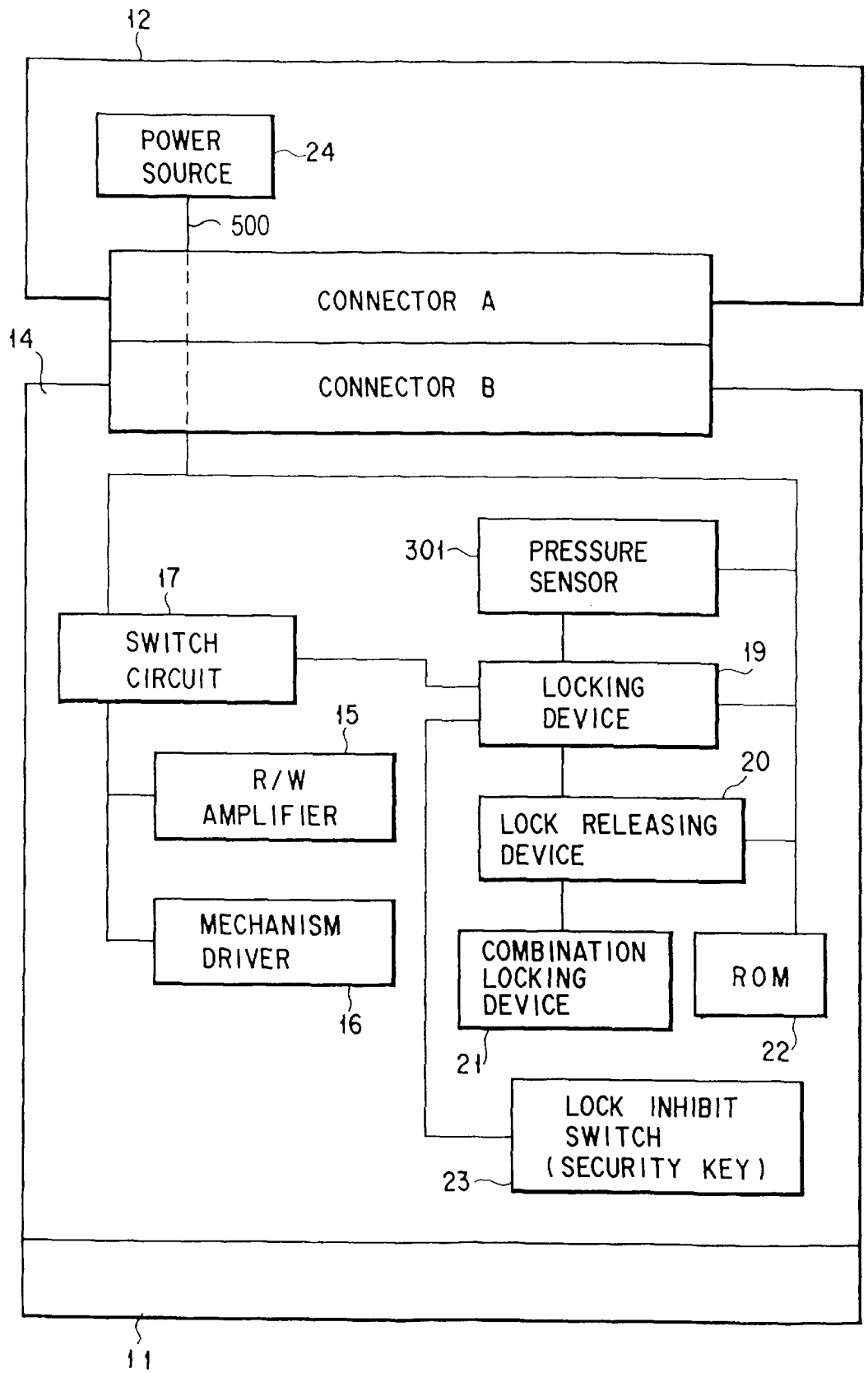
F I G. 3

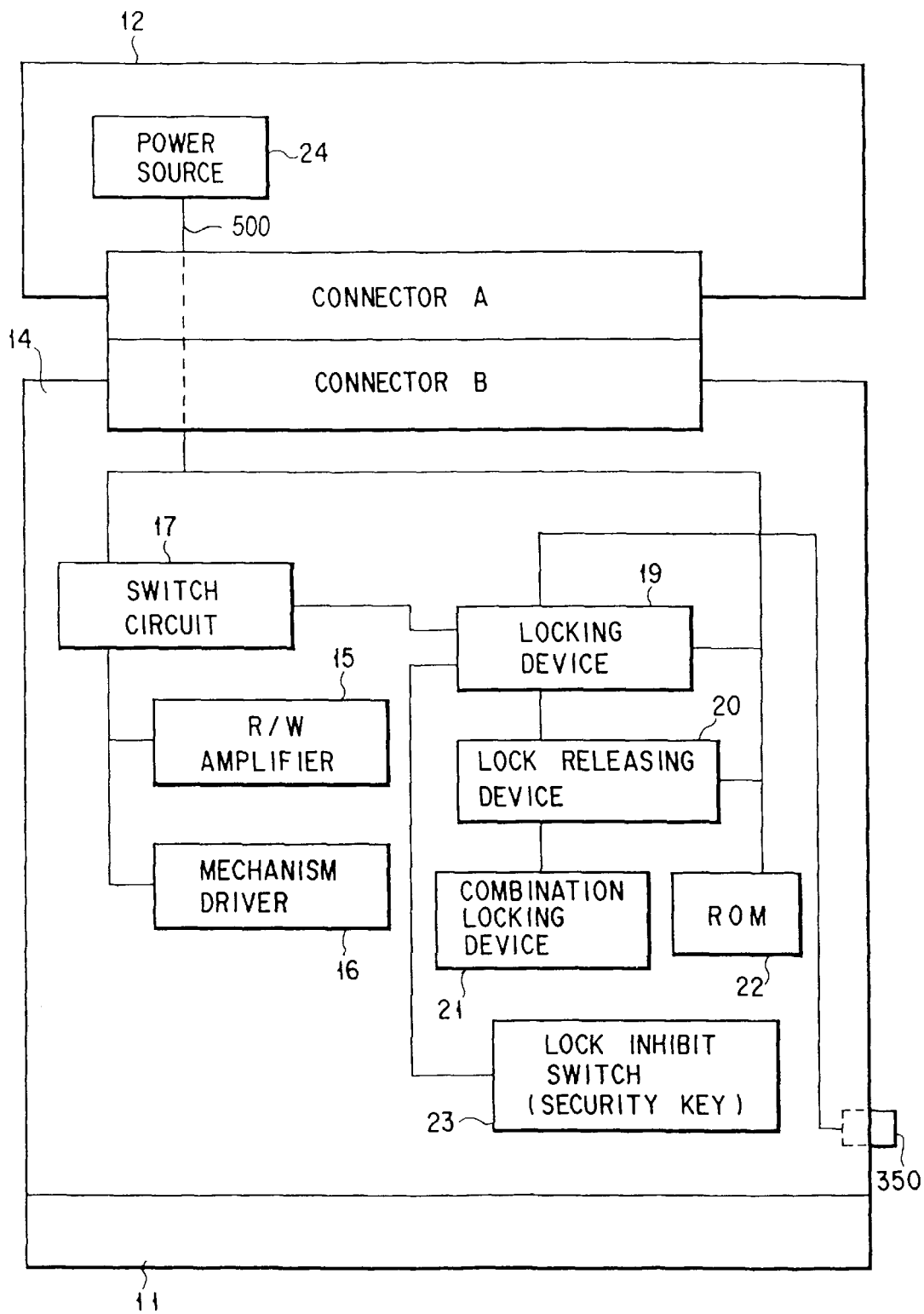
F I G. 4

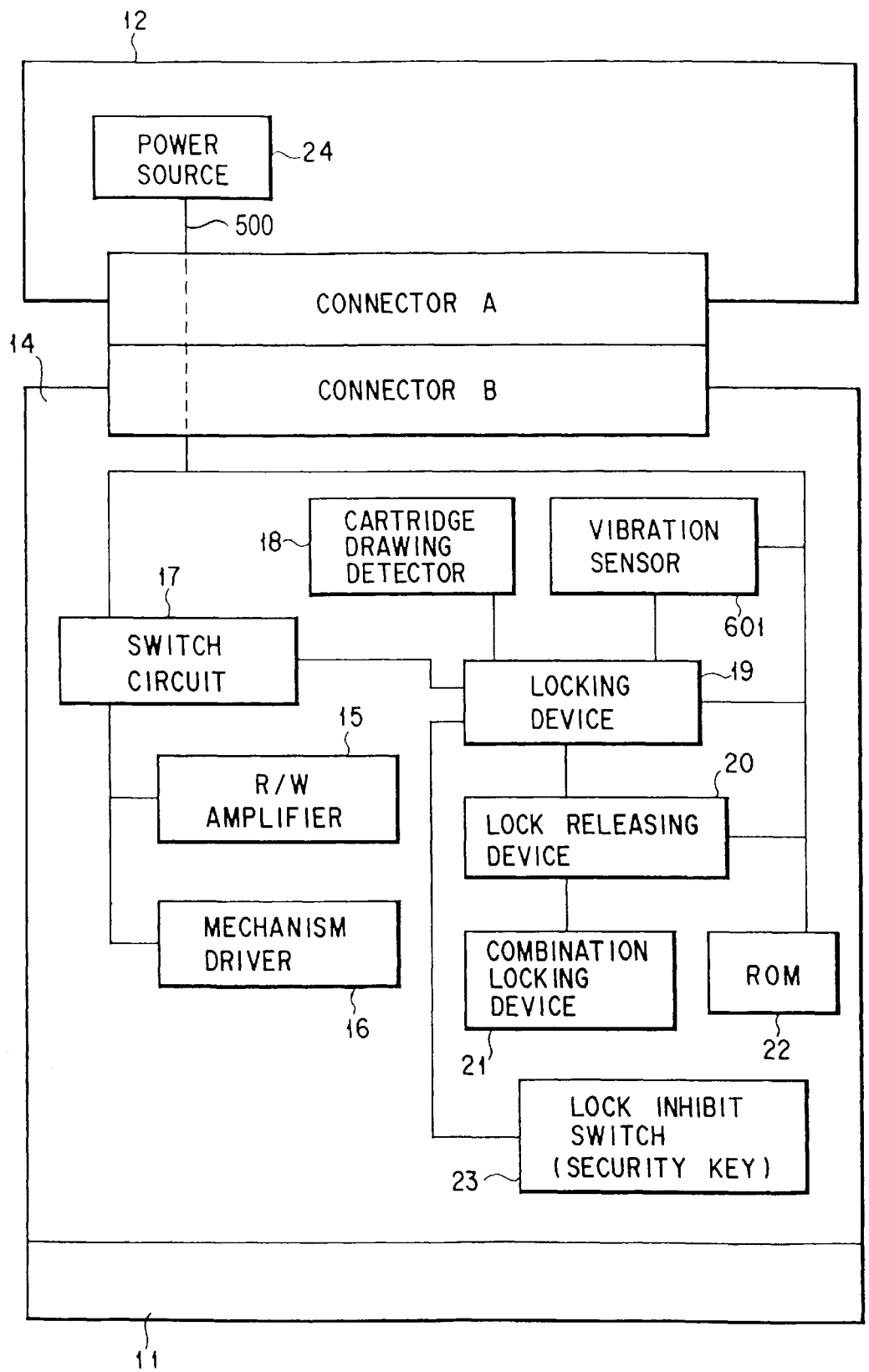
F I G. 6

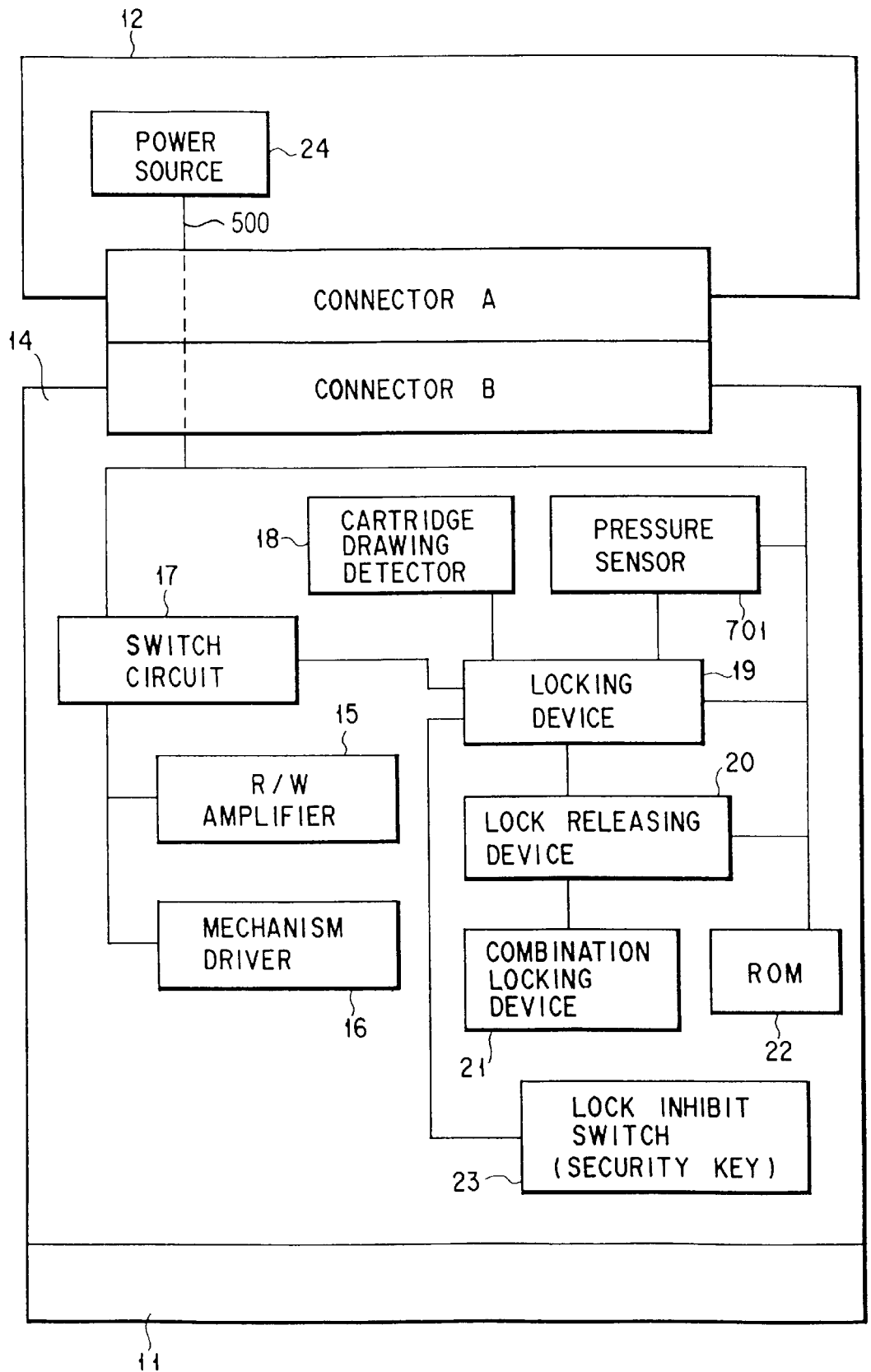
F I G. 7

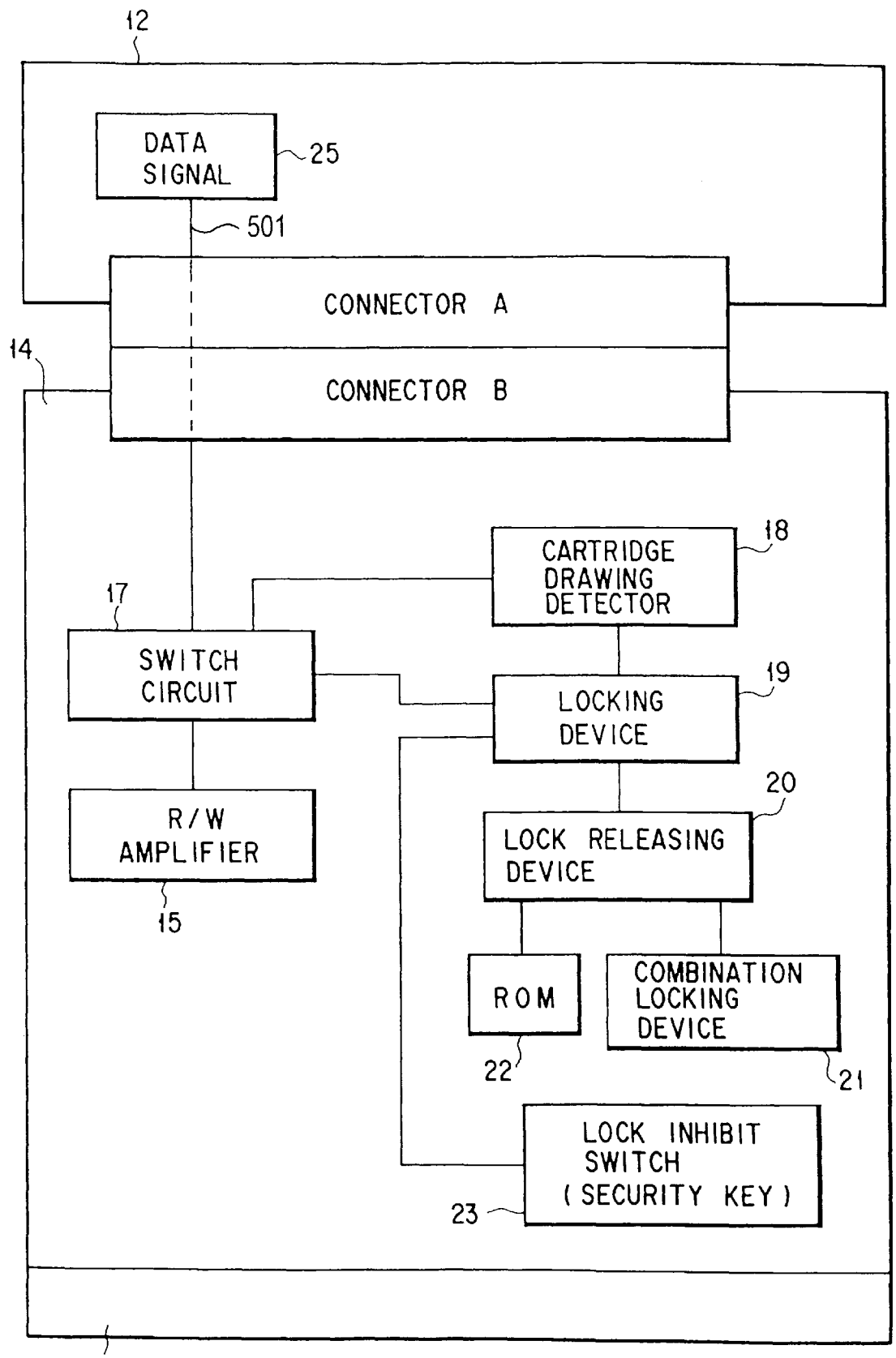
F I G. 9

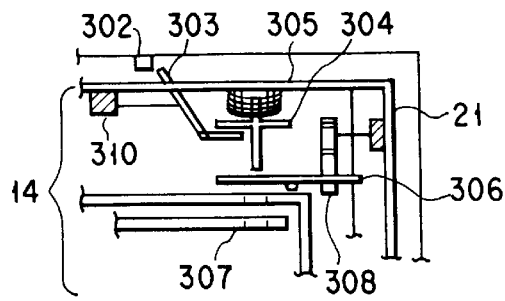
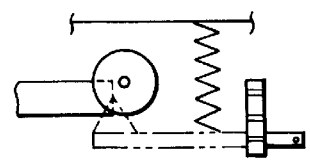
FIG. 11A     FIG. 11B
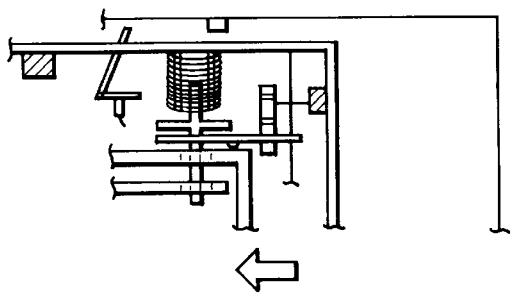
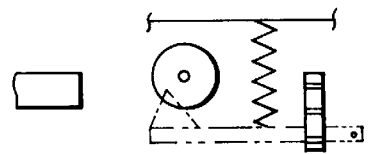
FIG. 12A     FIG. 12B
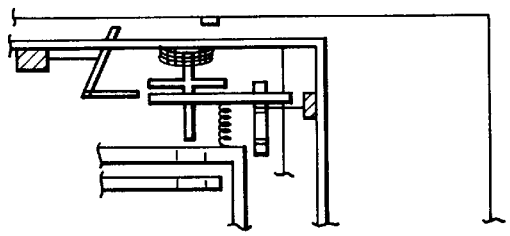
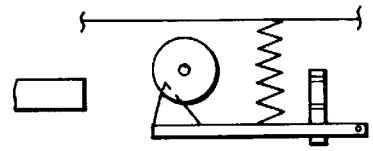
FIG. 13A     FIG. 13B
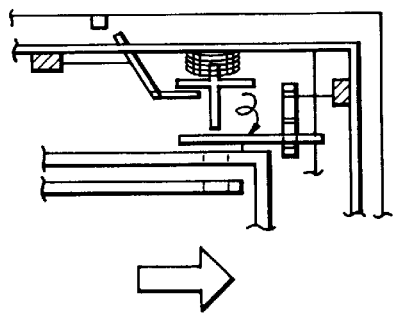
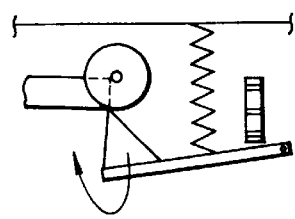
FIG. 14A     FIG. 14B

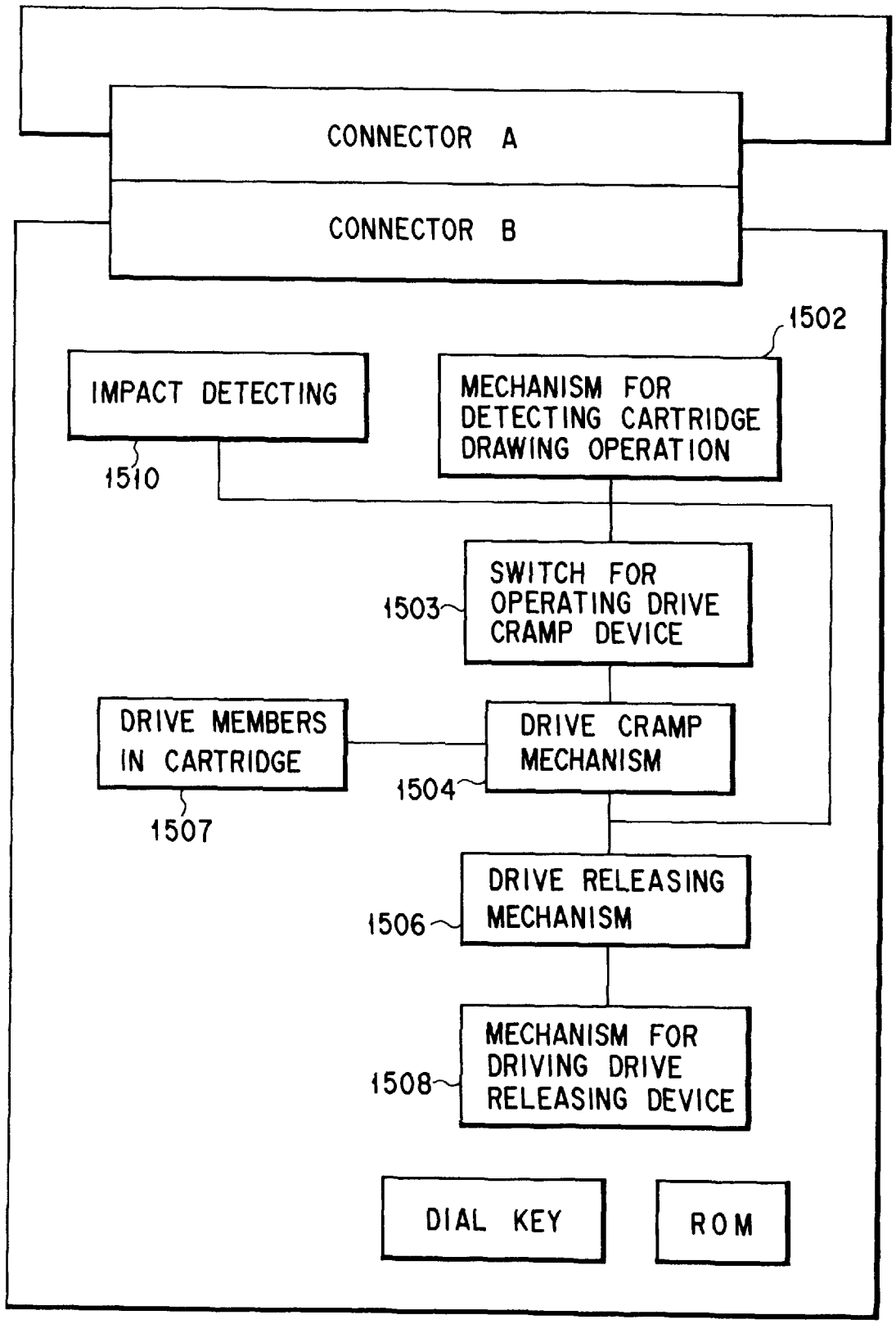
F I G. 15

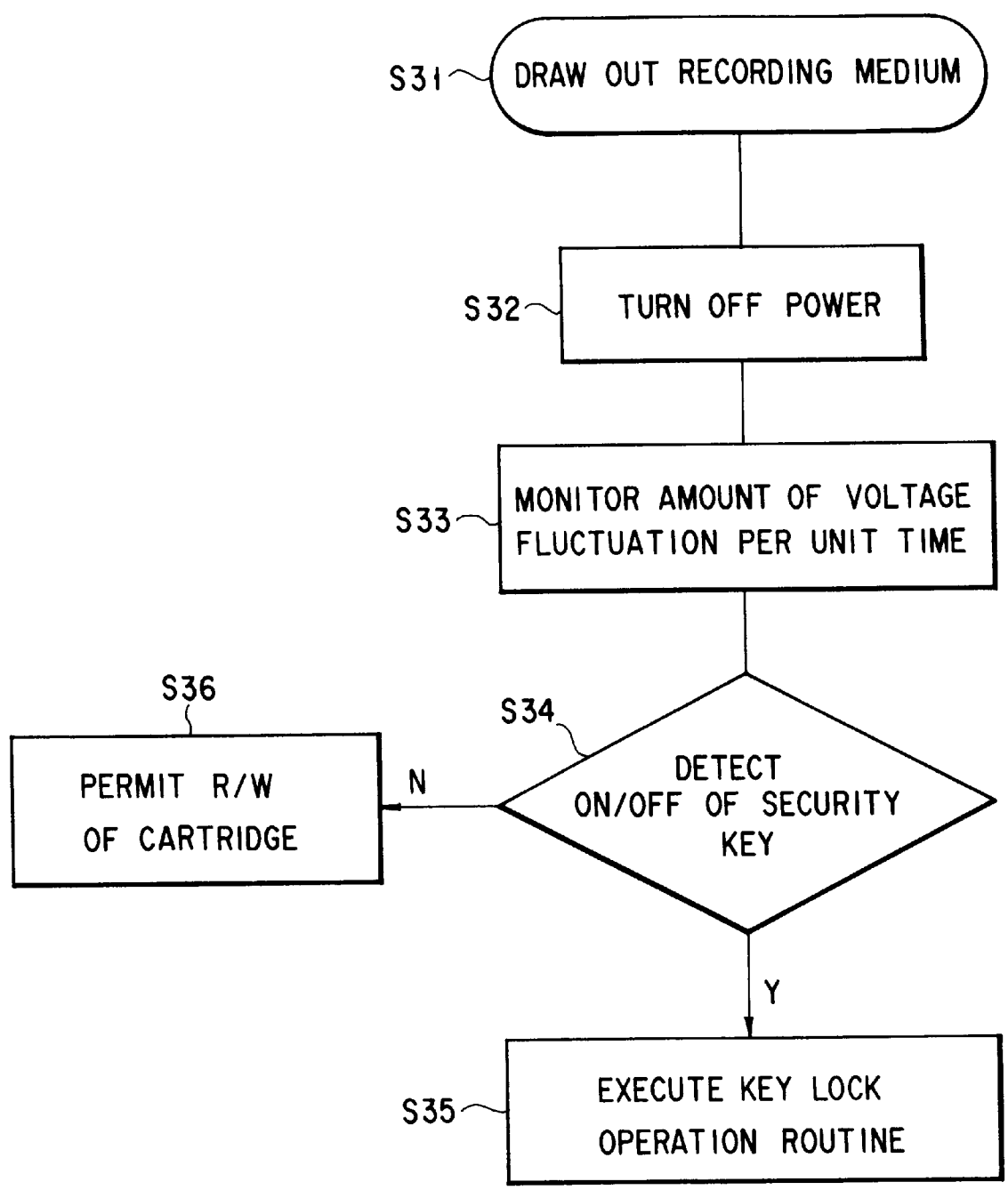
F I G. 16

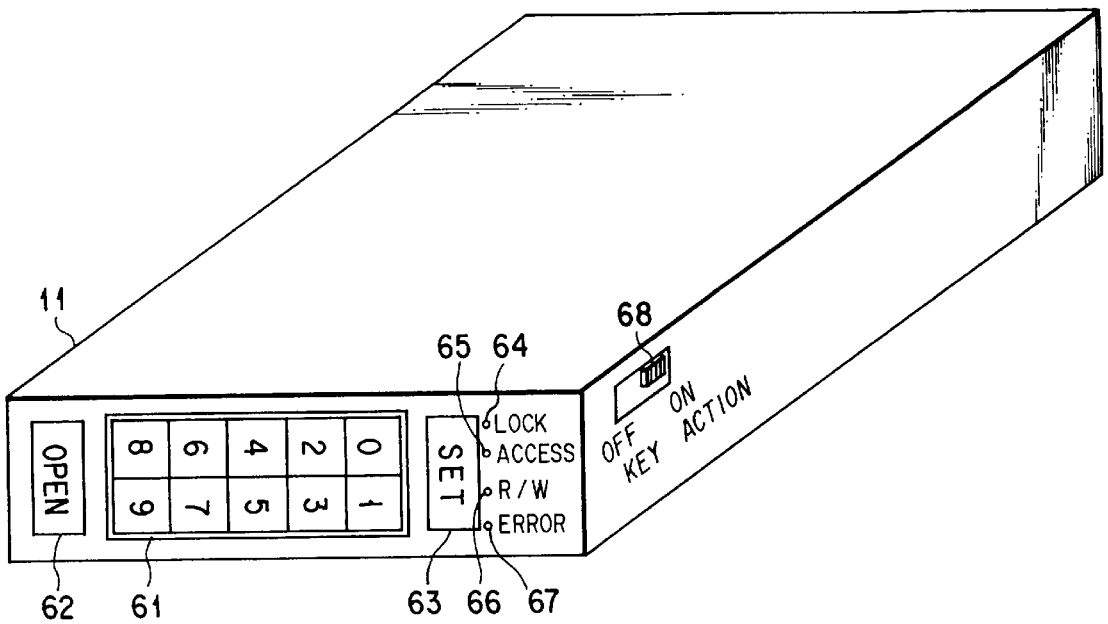
F I G. 19
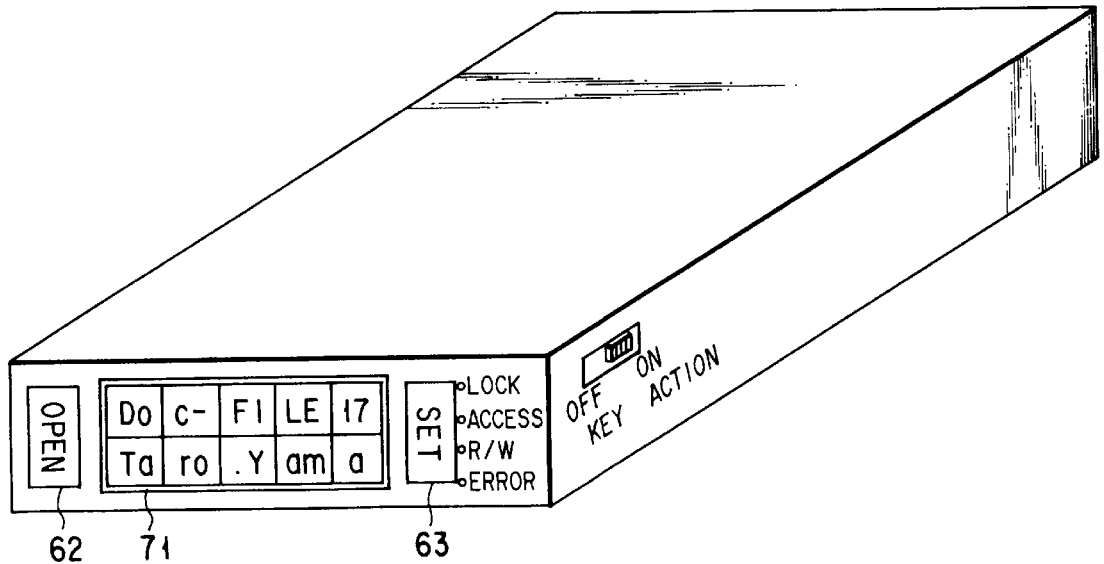
F I G. 20

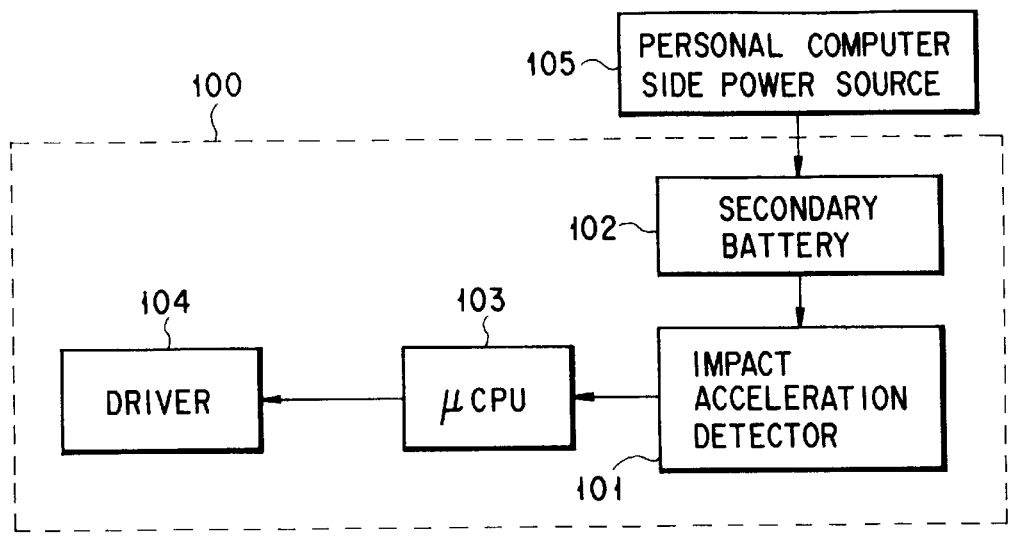
F I G. 21
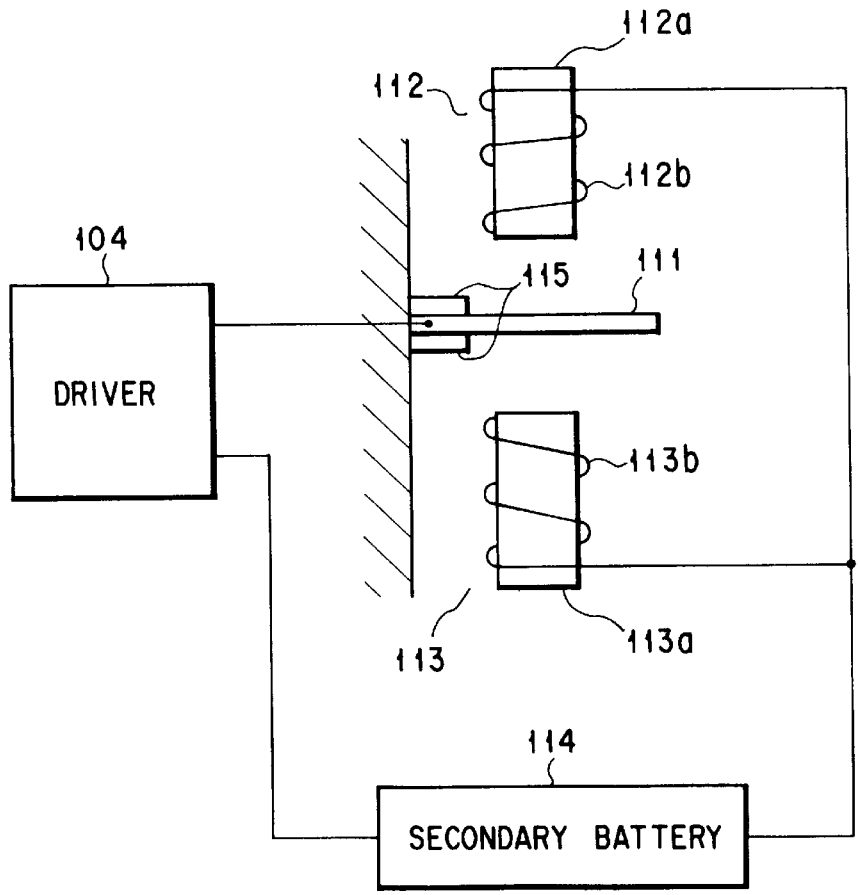
F I G. 22

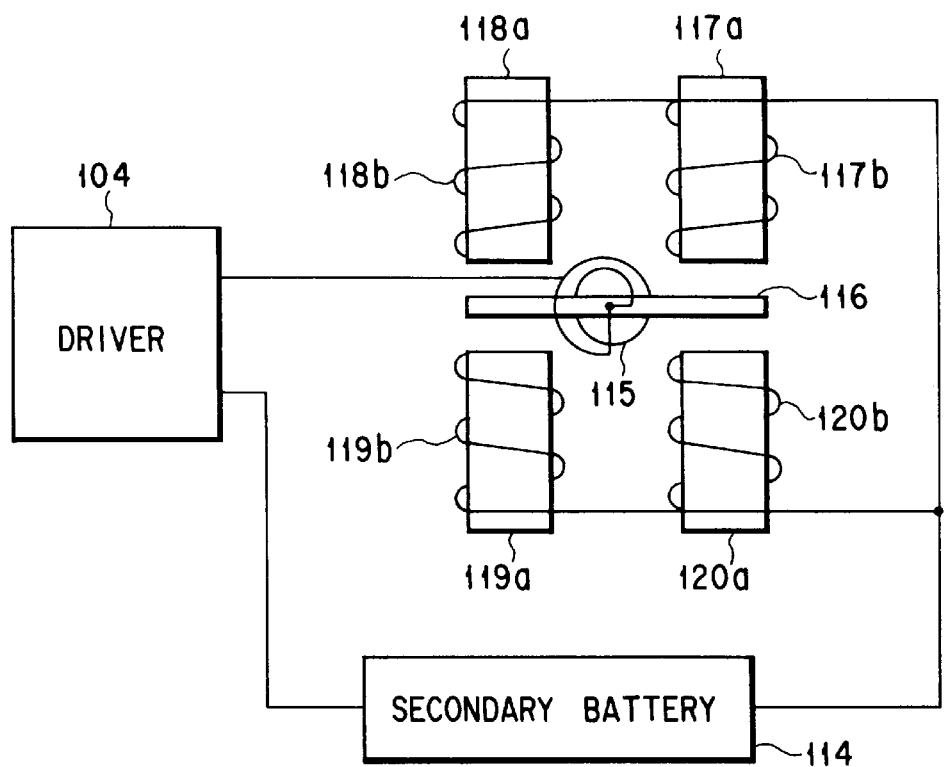
F I G. 23
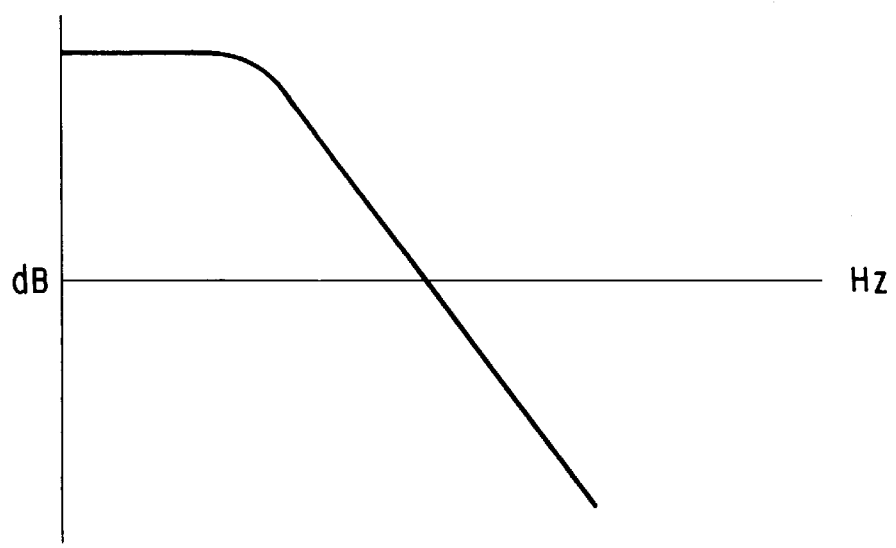
F I G. 24

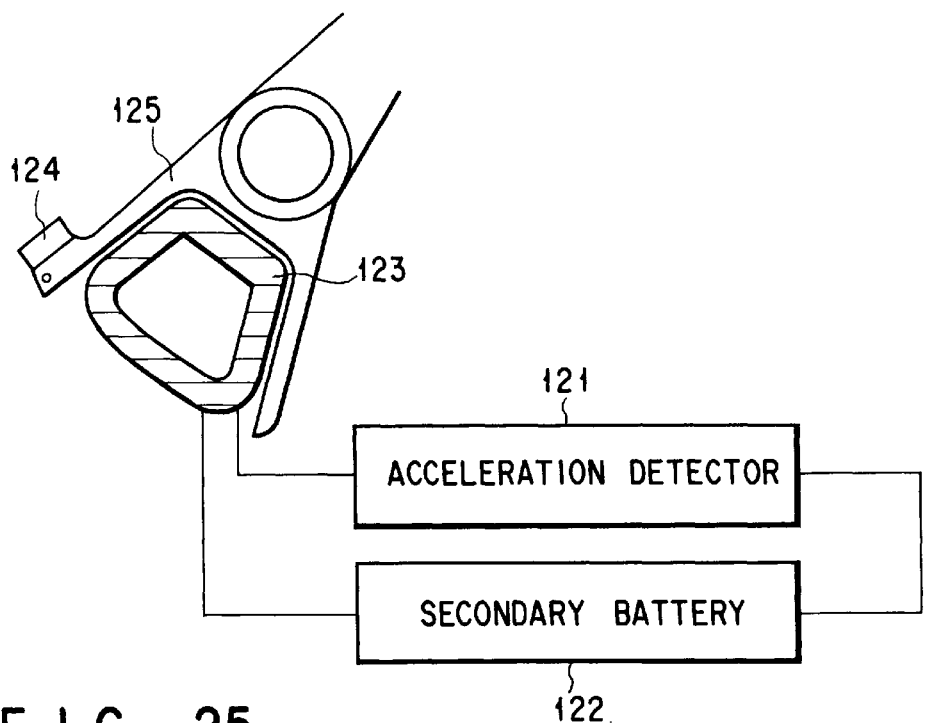
F I G. 25
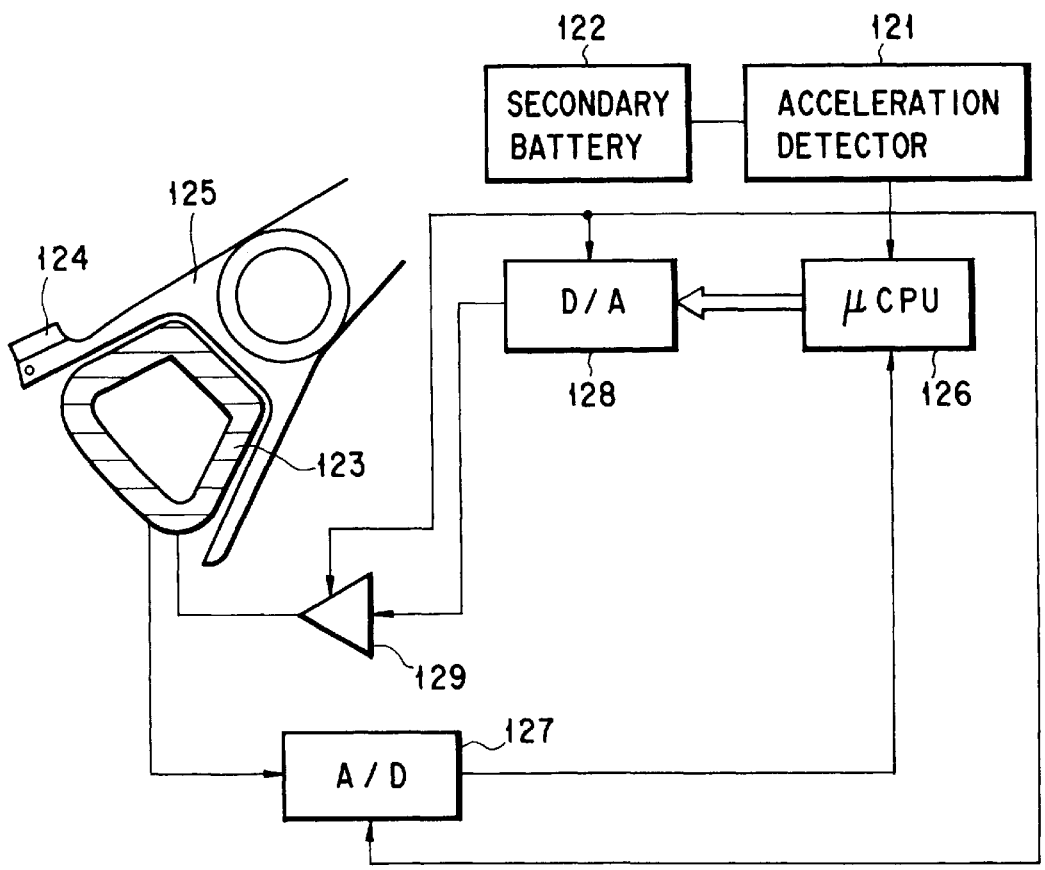
F I G. 26

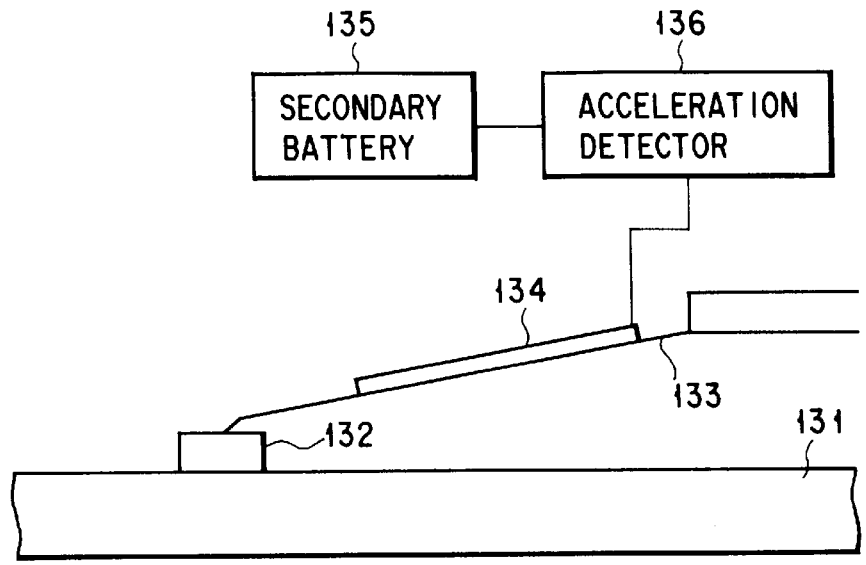
F I G. 27
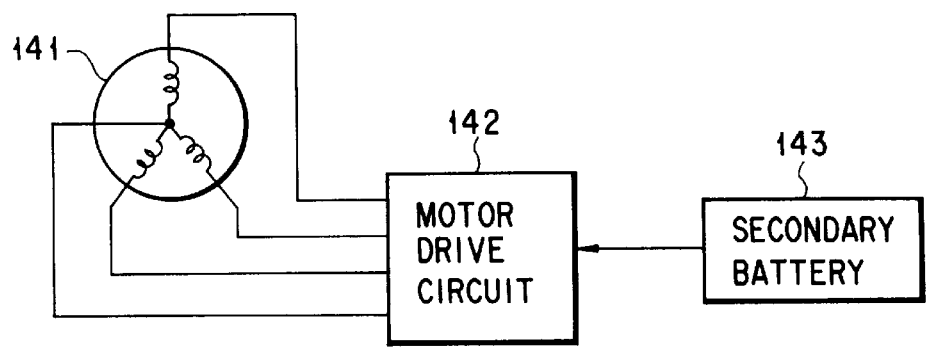
F I G. 28
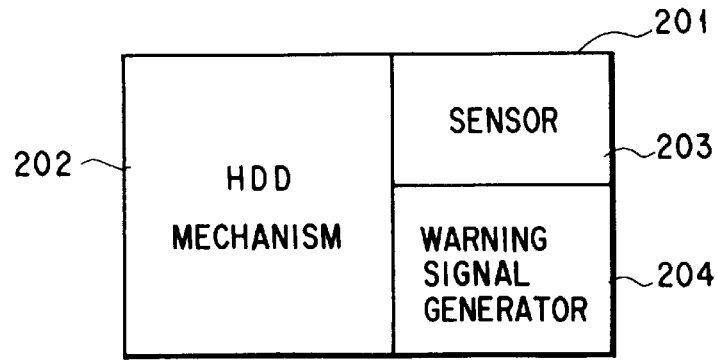
F I G. 29

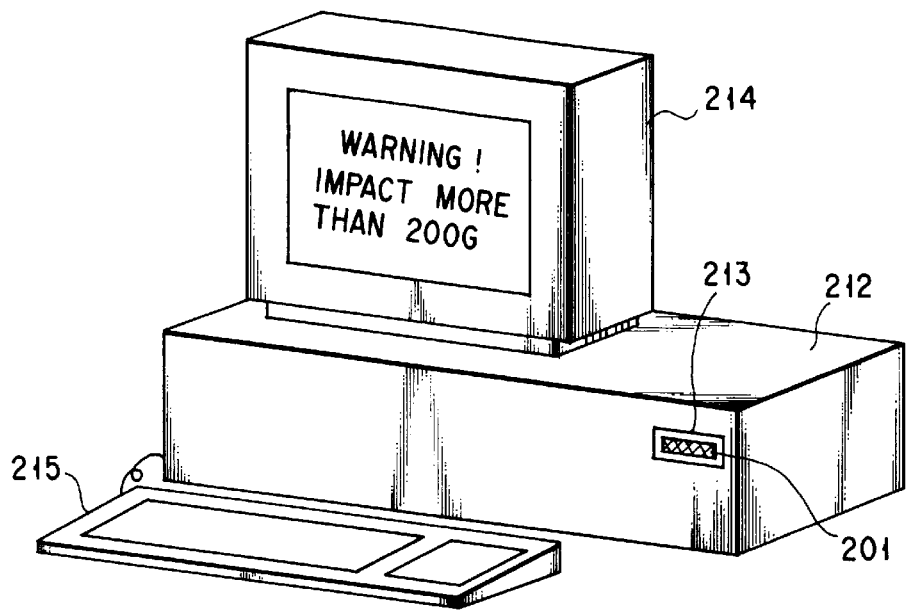
F I G. 33
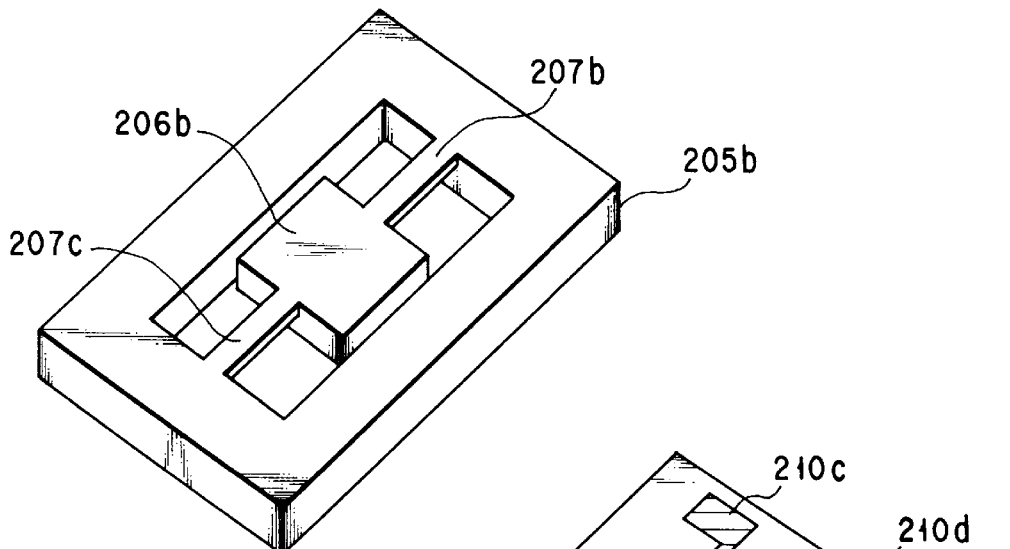
F I G. 34
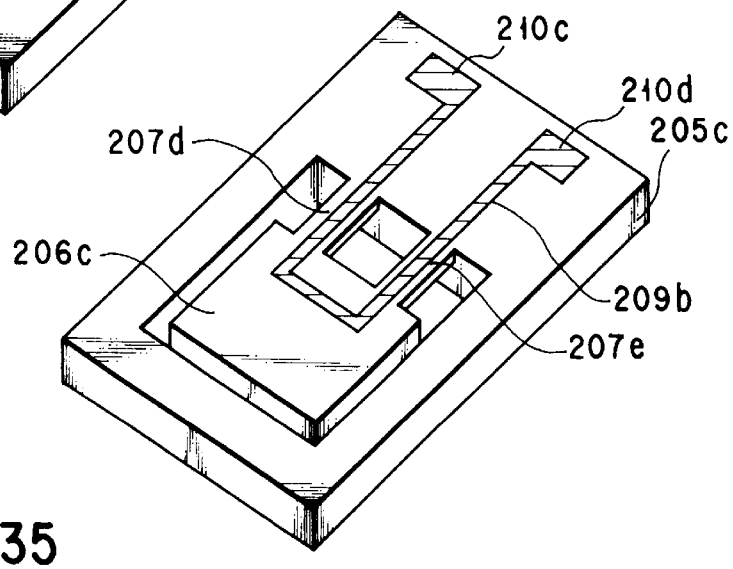
F I G. 35

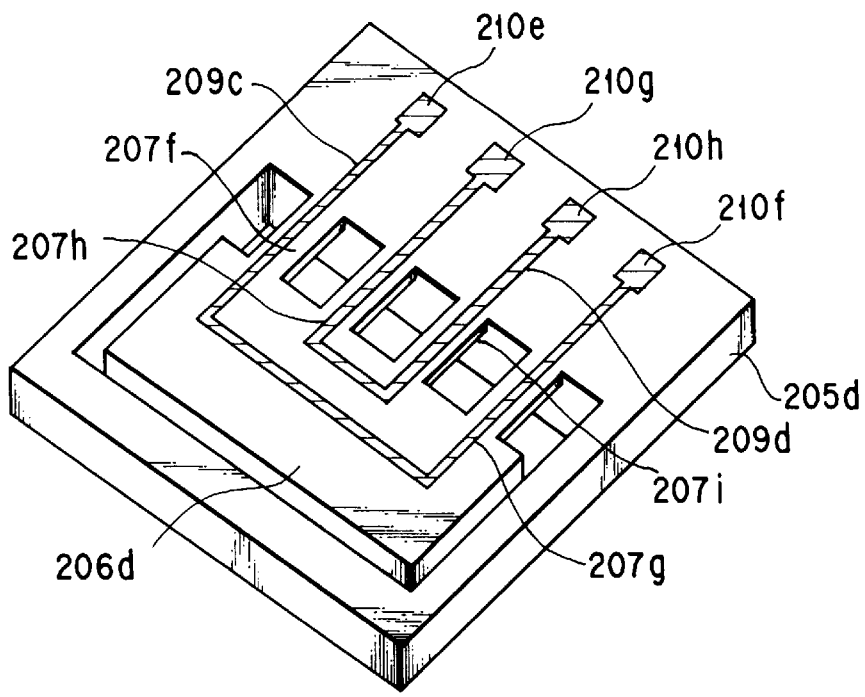
F I G. 36
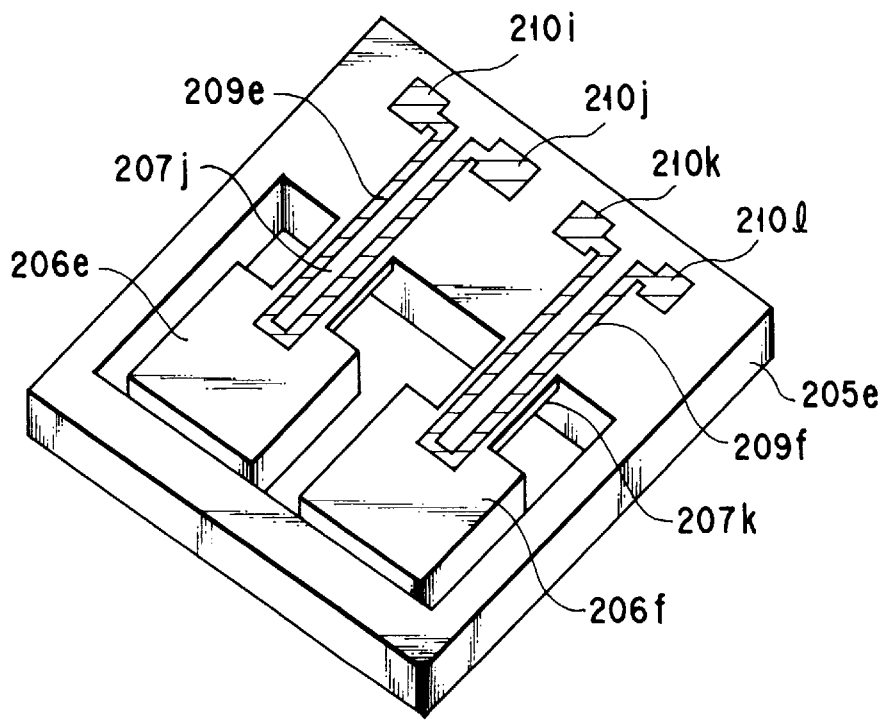
F I G. 37

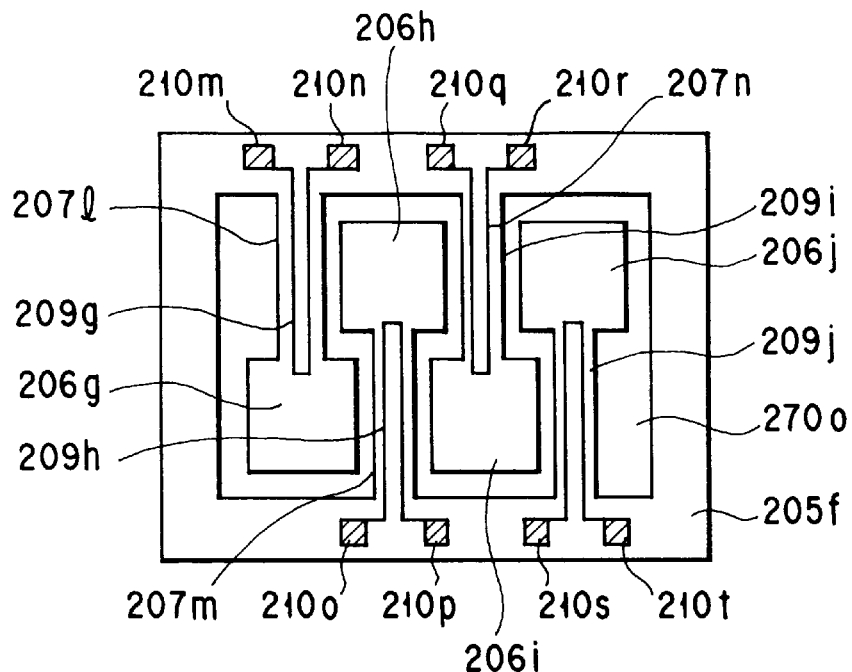
F I G. 38
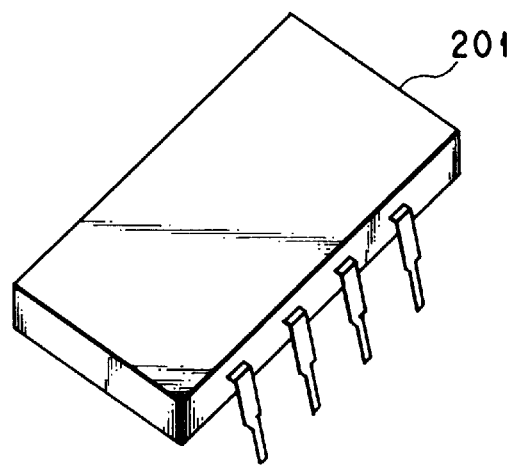
F I G. 39

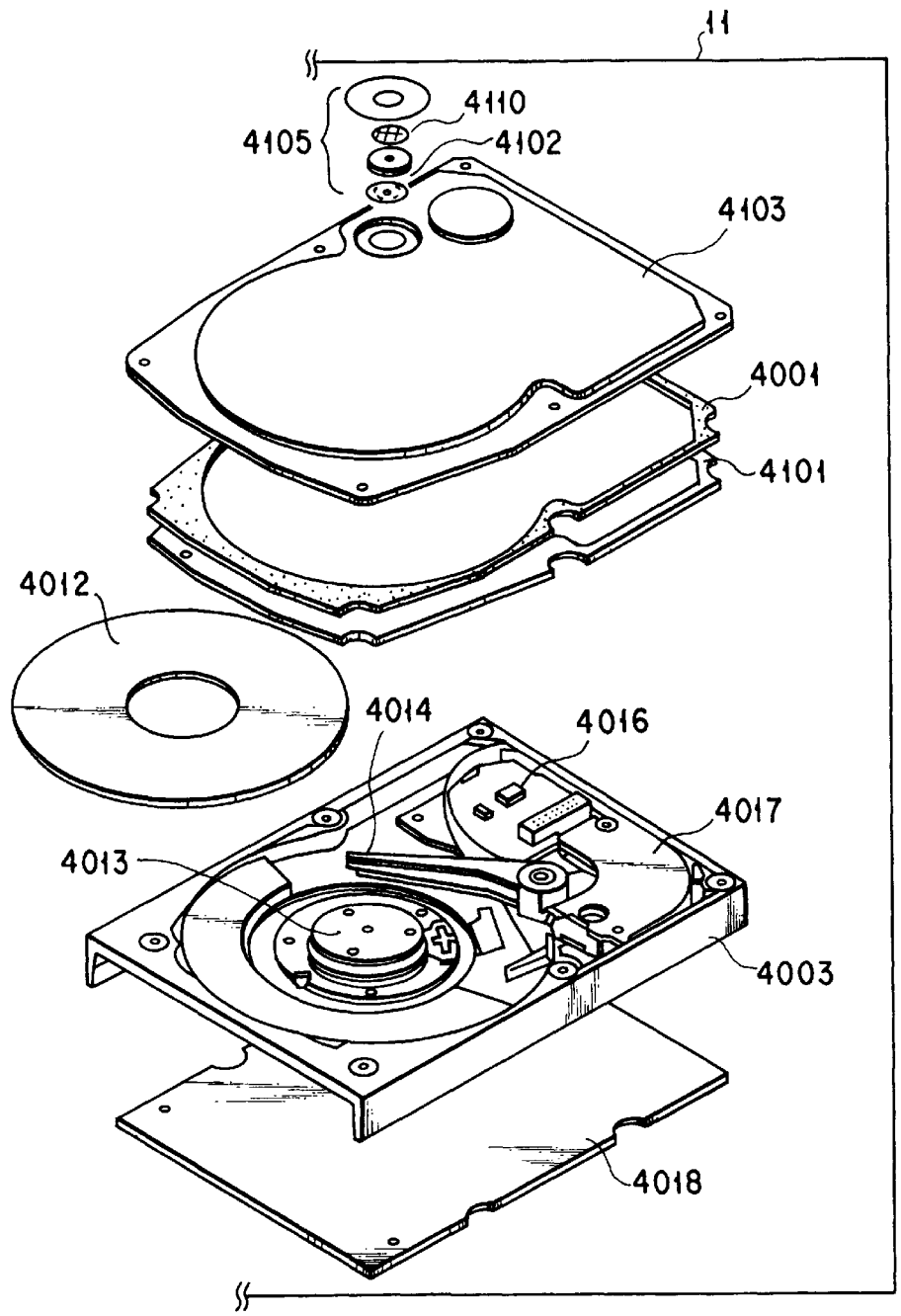
F I G. 40
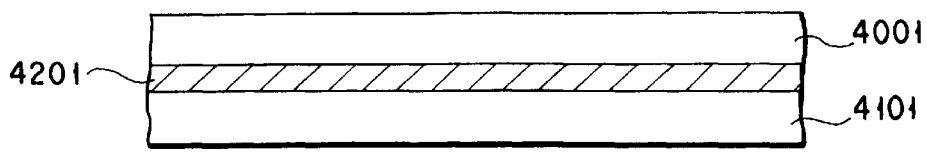
F I G. 41

DATA STORAGE APPARATUS

This application is a continuation, of application Ser. No. 08/460,774, filed Jun. 2, 1995, now abandoned.

BACKGROUND OF THE INVENTION

1. Field of the Invention

The present invention relates to a data storage apparatus, such as a magnetic disk apparatus, loaded in a personal computer or the like.

2. Description of the Related Art

In a conventional magnetic recording apparatus incorporating a hard disk, loaded in an information equipment (e.g., a personal computer), data is protected by means of changing a file attribute (whether data can be read or written) or using a password, and a cartridge of the magnetic recording apparatus cannot be locked for the purpose of protection. Recently, however, a magnetic disk apparatus, in which a read/write operation can be prohibited by means of a lockable switch, is proposed (e.g., Jpn. Pat. Appln. KOKAI Publication No. 54-53509). Such a data storage apparatus with a lockable switch is applied to a desk-top apparatus but cannot be applied to a portable apparatus with a cartridge incorporating a memory medium.

In the conventional apparatus, to provide vibration resistance or impact resistance while a magnetic disk is being operated, a controllable frequency range of a magnetic head positioning control system is widened to increase the gain in a low frequency range. Alternatively, the magnetic head positioning controller is designed so that an open loop has a sufficient gain with respect to a frequency component corresponding to an external vibration applied to the magnetic disk or that a settling function has a sufficient suppression ratio with respect to a frequency component corresponding to an external vibration applied to the magnetic disk. In this case, servo information consisting of patterns repeated in a predetermined frequency on a part of the sector on a track which is called a servo sector is previously over the inner and outer peripheries of the magnetic desk. The servo information is read out by the magnetic head, so that the control for resisting impact is performed. For this reason, in the magnetic head positioning control system, data is sampled in a sampling period determined by the number of servo sectors and the rotating speed of the disk. Therefore, the controllable frequency range of the magnetic head positioning control system is limited by the sampling frequency. As a result, the magnetic disk apparatus cannot have a sufficient impact resistance. In order to provide a sufficient impact resistance, an acceleration sensor is arranged in a magnetic disk apparatus so that an impact applied to the magnetic disk apparatus during the operation of the disk apparatus is detected by the acceleration sensor, thereby prohibiting data from being written into a disk surface in accordance with the degree of the acceleration detected by the acceleration sensor. There is also a method of compensating an influence of impact or acceleration applied to the magnetic disk by feed-forward using an output from the acceleration sensor.

Recently, information equipment, i.e., a personal computer, has become more and more compact and light. In addition, a data storage apparatus itself, such as a magnetic disk apparatus, has become compact and highly integrated, and removable from a personal computer, a facsimile apparatus or a telephone set. Under the circumstances, the importance of security of recorded data has been increasing. To protect data, a password has been provided for recorded data, for example, a file of software. However, the password may easily be decoded by an unauthorized person or broken by a computer virus or the like.

The conventional method for obtaining a vibration resistance or impact resistance is to compensate an influence of vibration or impact in a magnetic disk operating time (while the magnetic disk apparatus is operating), and not in a magnetic disk nonoperating time (while the magnetic disk apparatus is not operating). Further, to increase the impact resistance in the magnetic disk non-operating time, mechanical measures have been taken: for example, to keep the magnetic head unloaded so as not to be brought into contact with the disk surface or to increase the latch force of a VCM (voice coil motor). Since the impact resistant performance of the magnetic disk apparatus in a disk non-operating time depends on mechanical factors as described above, it is necessary to increase mechanical impact resistance of the magnetic disk in order to increase the impact resistance performance of the magnetic disk apparatus in a disk non-operating time. However, it is very difficult and expensive to increase the impact resistance of the magnetic disk apparatus by means of mechanical factors.

SUMMARY OF THE INVENTION

An object of the present invention is to provide a secured data storage apparatus, such as a portable magnetic disk apparatus, which can prevent data stored therein from being leaked, stolen or broken by an unauthorized person.

Another object of the present invention is to provide a data storage apparatus, in which an operation of reading data therefrom or writing data therein is restricted by not only software means but also hardware means, so that data is reliably protected and the probability of breakage of data or leakage of a secret is reduced.

Still another object of the present invention is to provide an impact resistant apparatus, which can reduce an influence of an external impact applied thereto, in a magnetic disk non-operating time, on a magnetic disk apparatus.

According to a first aspect of the present invention, there is provided a data storage apparatus comprising: a cartridge which is attachable to and detachable from an information equipment main body and incorporates a data recording medium or recording element; data reading and writing inhibiting means for inhibiting data from being written in or read from the data storage medium or recording element; and operating means for detecting that the cartridge is detached from the information equipment main body and causing the data reading and writing inhibiting means to operate in response to a detection result.

According to a second aspect of the present invention, there is provided a data storage apparatus attachable to and detachable from information equipment, comprising: a rotary driving mechanism for rotating a magnetic disk storing positioning data for positioning a magnetic head; a moving mechanism for moving the magnetic head in radial directions of the magnetic disk based on a positioning control signal; a secondary battery, incorporated in the data storage apparatus, for supplying power to the data storage apparatus; acceleration detecting means for detecting an acceleration externally applied to the data storage apparatus, when the data storage apparatus is not operating; supplying means for supplying the power of the secondary battery to the data storage apparatus in response to a result of acceleration detection by means of the acceleration detecting means; and charging means for charging the secondary battery when the data storage means is operating.

According to a third aspect of the present invention, there is provided a portable data storage apparatus, comprising: a cartridge which is attachable to and detachable from information equipment and incorporates a data recording medium or recording element; an impact sensor, incorporated in the cartridge, for detecting an impact applied to the cartridge; and a device having a function of providing a warning that the data storage apparatus has received a great impact, when the impact detected by the impact sensor is greater than a preset value.

According to the present invention, a device which can be electrically connected to or disconnected from, for example, a data reproducing and inputting apparatus, is mounted in a removable and portable cartridge incorporating a recording medium. When the cartridge is removed from the data inputting and reproducing apparatus, the electrical connection is automatically cutoff and locked. The electrical connection cannot be restored so as to permit reading/writing of data, until the lock is released by means of a key. With this structure, change of data reading or writing mode is restricted by means of a mechanism which can be automatically locked when the cartridge is drawn out of the data inputting and reproducing apparatus, so that it can be ensured that data is protected even after the cartridge is drawn out. As a result, a data storage apparatus of a reliable security is provided.

According to the present invention, when the magnetic disk apparatus receives an acceleration when it is not operating, it is fed by the secondary battery incorporated therein, to restrict the driving of the voice coil motor, the operation range of a gimbal supporting the magnetic head and the rotation of the spindle motor. In this manner, the influence of an impact applied to the magnetic disk apparatus during an non-operating time can be suppressed.

In addition, when the internal mechanism of the magnetic disk apparatus is broken or it receives an impact which may hinder the driving thereof, a warning is given to inform the user that the disk apparatus has received a great impact. Therefore, the user can take a necessary action to maintain the data stored in the disk apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a block diagram showing the data storage apparatus of the first embodiment and an information equipment in which the data storage apparatus is loaded;

FIG. 3 is a block diagram showing a modification of the data storage apparatus of the first embodiment and an information equipment in which the data storage apparatus is loaded;

FIG. 4 is a block diagram showing another modification of the data storage apparatus of the first embodiment and an information equipment in which the data storage apparatus is loaded;

FIG. 6 is a block diagram showing a further modification of the data storage apparatus of the first embodiment and an information equipment in which the data storage apparatus is loaded;

FIG. 7 is a block diagram showing a still further modification of the data storage apparatus of the first embodiment and an information equipment in which the data storage apparatus is loaded;

FIG. 9 is a block diagram showing a data storage apparatus according to a second embodiment of the present invention and an information equipment in which the data storage apparatus is loaded;

FIGS. 11A and 11B are diagrams showing operation states of mechanisms of the data storage apparatus shown in FIG. 4;

FIGS. 12A and 12B are diagrams showing operation states of mechanisms of the data storage apparatus shown in FIG. 4;

FIGS. 13A and 13B are diagrams showing operation states of mechanisms of the data storage apparatus shown in FIG. 4;

FIGS. 14A and 14B are diagrams showing operation states of mechanisms of the data storage apparatus shown in FIG. 4;

FIG. 15 is a block diagram showing operation states of portions of the data storage apparatus shown in FIG. 4;

FIG. 16 is a flowchart showing a procedure of a locking operation of the data storage apparatus of the first and second embodiments;

FIG. 19 is a perspective view of a numeral panel of the data storage apparatus of the fourth embodiment;

FIG. 20 is a perspective view of a numeral panel of the data storage apparatus having a memorandum display function according to the fourth embodiment;

FIG. 21 is a block diagram showing a magnetic disk apparatus as an example of the data storage apparatus of the fifth embodiment;

FIG. 22 is a schematic diagram showing a shock acceleration detector of the magnetic disk apparatus of the fifth embodiment;

FIG. 23 is a schematic diagram showing another shock accelerating detector used in the magnetic disk apparatus of the fifth embodiment;

FIG. 24 is a diagram showing a frequency characteristic of a plate spring for detecting an acceleration applied to a magnetic disk apparatus, when the magnetic disk apparatus is not operating;

FIG. 25 is a diagram for explaining a method for driving a voice coil motor by power supplied from a secondary battery of the magnetic disk apparatus of the fifth embodiment;

FIG. 26 is a diagram for explaining another method for driving a voice coil motor by the power supplied from a secondary battery of the magnetic disk apparatus of the fifth embodiment;

FIG. 27 is a diagram for explaining a method for avoiding a collision between a magnetic head and a magnetic disk surface of the magnetic disk apparatus of the fifth embodiment due to an acceleration externally applied when the magnetic disk apparatus is not operating;

FIG. 28 is a diagram for explaining a method for avoiding a collision between a magnetic head and a magnetic disk surface of the magnetic disk apparatus of the fifth embodiment by means of drive control of a spindle motor;

FIG. 29 is a schematic diagram showing a hard disk drive (HDD) unit with an impact alarm function as data storage apparatus according to a sixth embodiment of the present invention;

FIG. 33 is a perspective view of a personal computer in which the HDD unit with an impact alarm function of the sixth embodiment;

FIG. 34 is a perspective view of an impact sensor of the second example attached to the HDD unit with an impact alarm function of the sixth embodiment;

FIG. 35 is a perspective view of an impact sensor of the third example attached to the HDD unit with an impact alarm function of the sixth embodiment;

FIG. 36 is a perspective view of an impact sensor of the fourth example attached to the HDD unit with an impact alarm function of the sixth embodiment;

FIG. 37 is a perspective view of an impact sensor of the fifth example attached to the HDD unit with an impact alarm function of the sixth embodiment;

FIG. 38 is a perspective view of an impact sensor of the sixth example attached to the HDD unit with an impact alarm function of the sixth embodiment;

FIG. 39 is a perspective view of a sensor chip of an impact sensor used in the HDD unit with an impact alarm function of the sixth embodiment;

FIG. 40 is an exploded perspective view of a data storage apparatus according to the seventh embodiment of the present invention; and FIG. 41 is a cross-sectional view of a packing portion of the data storage apparatus of the seventh embodiment.

DETAILED DESCRIPTION OF THE PREFERRED EMBODIMENTS

Embodiments of the present invention will be described with reference to the accompanying drawings.

Figure 1:
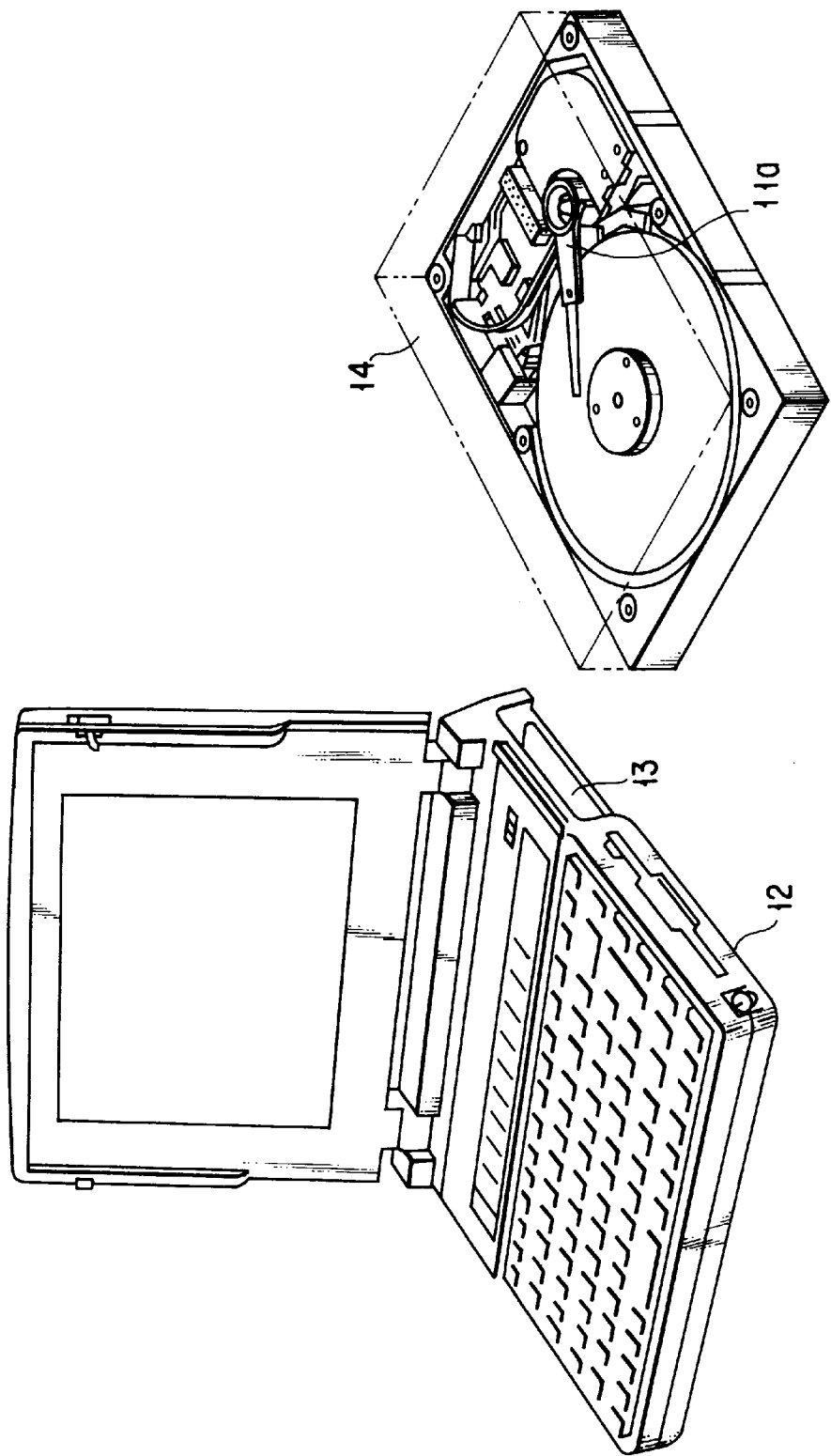
FIG. 1 is a perspective view of a data storage apparatus according to a first embodiment of the present invention and an information equipment (personal computer) in which the data storage apparatus is loaded.

FIG. 1 shows a personal computer as information equipment using a data storage apparatus according to a first embodiment of the present invention. As shown in FIG. 1, a data storage apparatus, for example, a hard disk drive (HDD) unit 11, attachable to and detachable from a personal computer 12, is loaded in a cartridge holder 13 formed in a side portion of the personal computer 12 and electrically connected to the personal computer 12.

As shown in FIG. 2, the cartridge 14 of the HDD unit 11 includes ICs, such as an R/W amplifier 15 and a mechanism driver 16 (e.g., a motor driver or a head actuator driver). The amplifier 15 and the mechanism driver 16 are connected to a connector B via a switch circuit 17. The switch circuit 17 is connected to a cartridge drawing detector 18, which detects whether the cartridge 14 is drawn from the computer 12 and controls a locking device 19. The locking device 19 locks the switch circuit 17 in a cutoff state in response to a detection result by means of the cartridge drawing detector 18. The lock state is released by a lock releasing device 20. The lock releasing device 20 collates a condition set in a combination lock device 21, for example, a dial key, with a content of a ROM 22. When they coincide with each other, the lock releasing device outputs a lock release request.

A lock inhibit switch (security key) 23 is security means for inhibiting the locking device 19 for turning off the switch circuit 17 from operating, in a case where the cartridge 14 is drawn when an auto-lock mode is off.

When the HDD unit is loaded in the personal computer 12, it is connected to the personal computer 12 through the connectors B and A and fed by a power source 24. The power supply from the power source 24 is turned on and off by means of the switch circuit 17.

In the above structure, if the cartridge 14 is drawn from the personal computer 12, this is detected by the cartridge drawing detector 18. When a draw detection signal output from the detector 18 is supplied to the locking device 19, the switch circuit 17 is turned off by the locking device 19 and locked in a cutoff state (auto-locked).

In a modification shown in FIG. 3, a pressure sensor 301 is used as the cartridge drawing detector 18. In this modification, the pressure sensor 301 is mounted on a side surface of a cartridge housing. When a detected pressure is greater than a preset value, the pressure sensor 301 supplies a request signal to the locking device 19 in order to lock the switch circuit 17 in the same manner as in the cartridge drawing detector 18. Even if the cartridge 14 is not drawn out, the above function serves to limit access to the HDD unit through the personal computer 12 by the user, so that data can be protected. For example, a projection is formed in the slot of the holder 13 of the information equipment (personal computer) 12. When the cartridge 14 is drawn from the personal computer, the pressure sensor 301 is pressed against the projection, thereby operating the pressure sensor. The projection can be substituted for an eject bar of the cartridge 14, or the like. Further, as shown in FIG. 4, a pressure sensor 350 can be provided on a surface of the cartridge 14, so that the sensor 350 can be operated when the user touches the surface of the cartridge, on which the sensor is provided, in order to insert or draw the cartridge 14 in or from the holder 13. The pressure sensor 350 can be constituted by at least a push button, and need not be a strain gauge, since it is only necessary that the pressure sensor 350 detect pressing force.

The lock releasing device 20 collates a number set in the combination lock device (dial key) 21 with a number set or prestored in the ROM 22. When they coincide with each other, the lock state is released by the lock releasing device 20.

When the cartridge 14 is inserted in the holder 13, if the dial key 21 is not set to the number prestored in the ROM 22, the lock releasing device 20 is not operated, and the switch circuit 17 is kept in the cutoff state and is not fed by the power source 24. Accordingly, the HDD unit is not operated, i.e., locked. If the dial key 21 is set to the number prestored in the ROM 22, the switch 17 is closed and brought into a conductive state, when the cartridge is inserted in the holder, with the result that the HDD unit, fed by the power source 24, is operated.

In a case where the lock inhibit switch (security key) 23 is on, that is, the auto-lock mode is off, when the cartridge 14 is drawn, the switch 17 is turned off, but the locking device is not operated. When the cartridge is inserted, the switch circuit is turned on and restored to the conductive state.

In the above embodiment, the security key 23 may not necessarily be provided. Moreover, the ON/OFF state of the security can be set through the main body of the information equipment (personal computer). Further, whether data can be read or written may be controlled by turning on or off a line of, for example, a data signal or a signal relating to data reading and writing (e.g., read/write timing pulse SYNC), instead of a source voltage signal.

Although not shown as an embodiment in the drawings, the data storage apparatus of the present invention may have a system structure comprising a locking device for fixing a mechanical part, instead of turning on/off the power source.

Another modification will be described with reference to FIG. 5. An apparatus shown in FIG. 5 has a vibration sensor 501, in place of the pressure sensor 301 shown in FIG. 3, in the housing of the cartridge 14. In the apparatus, vibration applied to the housing when the cartridge is drawn out, is detected by the vibration sensor 501. The vibration sensor 501 supplies to the locking device 19 a request signal for locking the switch circuit 17 in the same manner as in the cartridge drawing detector 18. The vibration sensor 501 can be mounted inside or outside of the housing of the cartridge 14, or a housing surface 510 at which the cartridge 14 is brought into contact with the personal computer.

Figure 5:
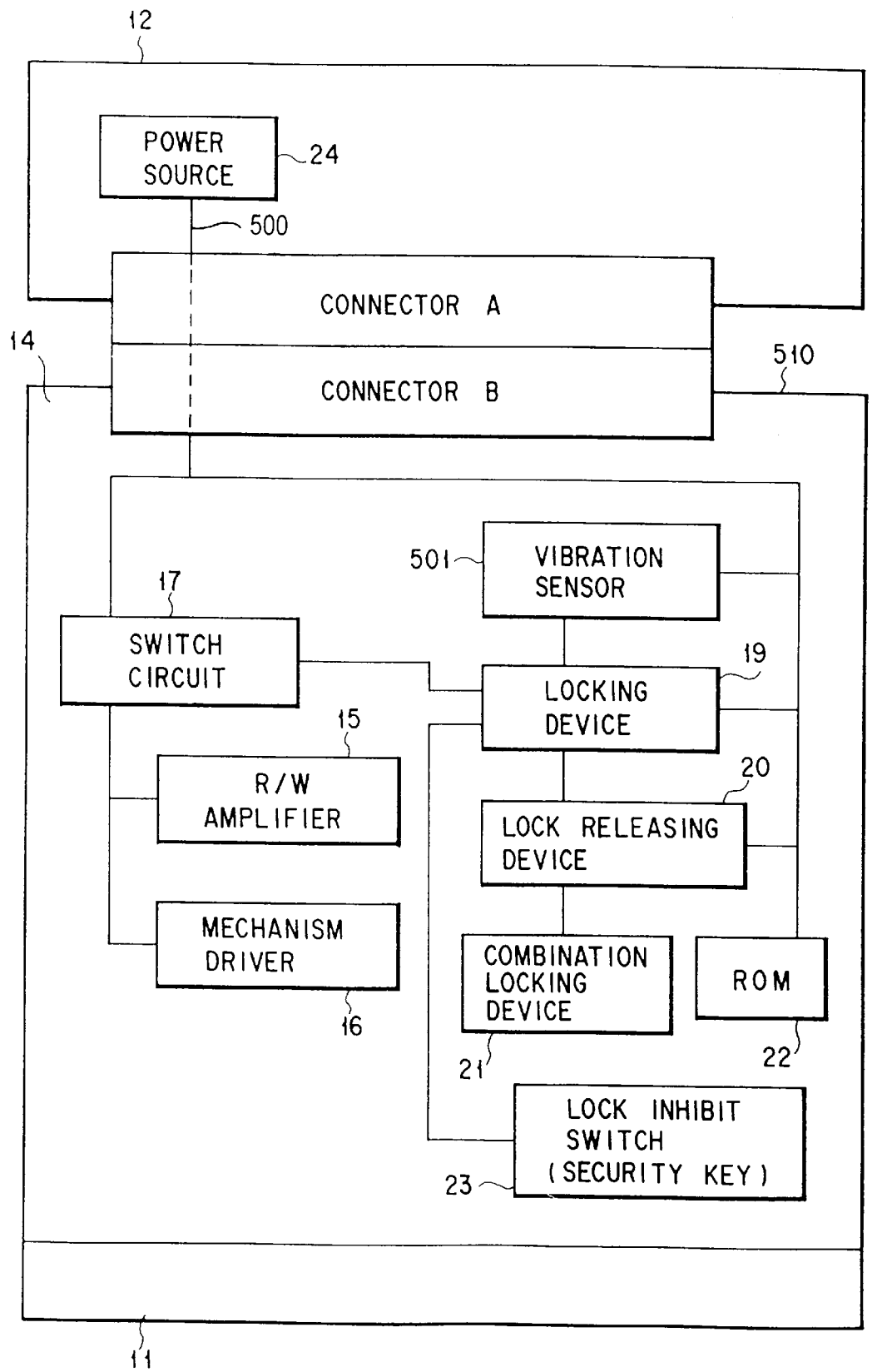
FIG. 5 is a block diagram showing still another modification of the data storage apparatus of the first embodiment and an information equipment in which the data storage apparatus is loaded.

Further, as shown in FIG. 6, both the vibration sensor 601 shown in FIG. 5 and the cartridge drawing detector (pressure sensor) 18 can be provided in the cartridge. In other words, FIG. 6 shows a modification which includes a plurality of cartridge drawing detectors. With the above structure, even if the cartridge 14 is not drawn out, the system structure serves to limit access to the information storage device such as the HDD unit through the information device such as the personal computer 12 by the user, so that data can be protected.

Furthermore, as shown in FIG. 7, both the pressure sensor 701 and the cartridge drawing detector 18 can be provided in the cartridge. As in the modification shown in FIG. 6, even if the cartridge 14 is not drawn out, the system structure serves to limit access to the HDD unit through the personal computer 12 by the user, so that data can be protected.

Figure 8:
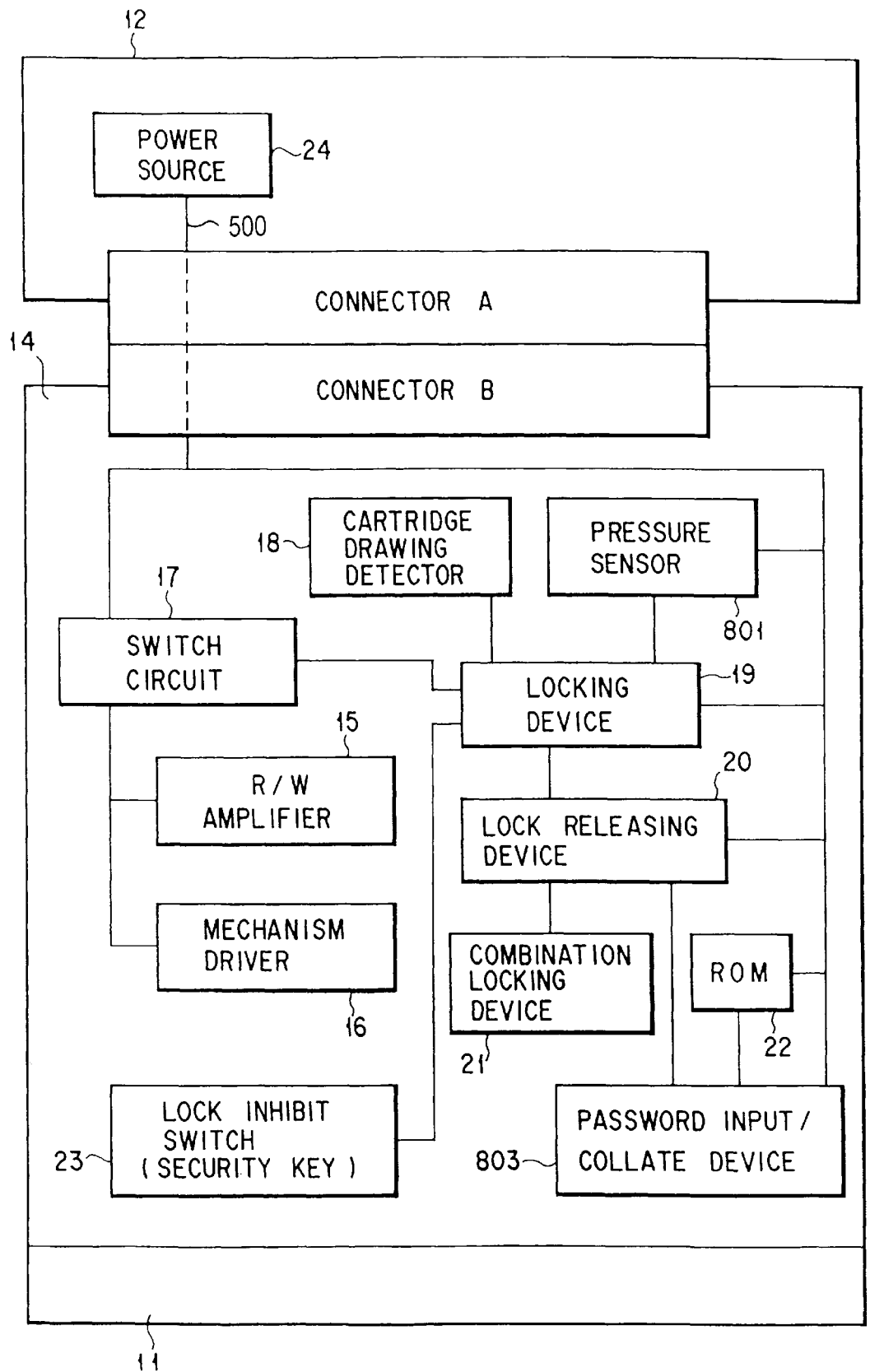
FIG. 8 is a block diagram showing a still another modification of the data storage apparatus of the first embodiment and an information equipment in which the data storage apparatus is loaded.

The structure shown in FIG. 8 comprises a password input/collate device 803 in addition to the system structure shown in FIG. 7. The password input/collate device 803 stores a password set by the user or the manufacturer and collates the password with an input password. When these passwords coincide with each other, the device 803 causes the lock releasing device 20 to operate, thereby releasing the lock. In other words, the locking device 19 can be released either by the combination lock device 21 or by the password input/collate device 803. With this structure, when the cartridge 14 is inserted in the information equipment 12, the user can release the switch circuit from the locked state without touching the cartridge 14, for example, by inputting a password through the keyboard of the information equipment 12. Similarly, the switch 17 can be locked in the same manner.

A second embodiment will be described with reference to FIG. 9. The second embodiment employs a locking mechanism for turning on and off a data signal instead of turning on and off the power source as in the first embodiment shown in FIG. 2. In the second embodiment, a data signal circuit 25 provided in the personal computer 12 is connected to a switch circuit 17 via connectors A and B, so that the operation of the personal computer is controlled by turning on and off the data signal supplied from the data signal circuit 25.

A cartridge drawing detector as used in the modifications shown in FIGS. 3 to 8 can also be applied to the second embodiment.

Figure 10:
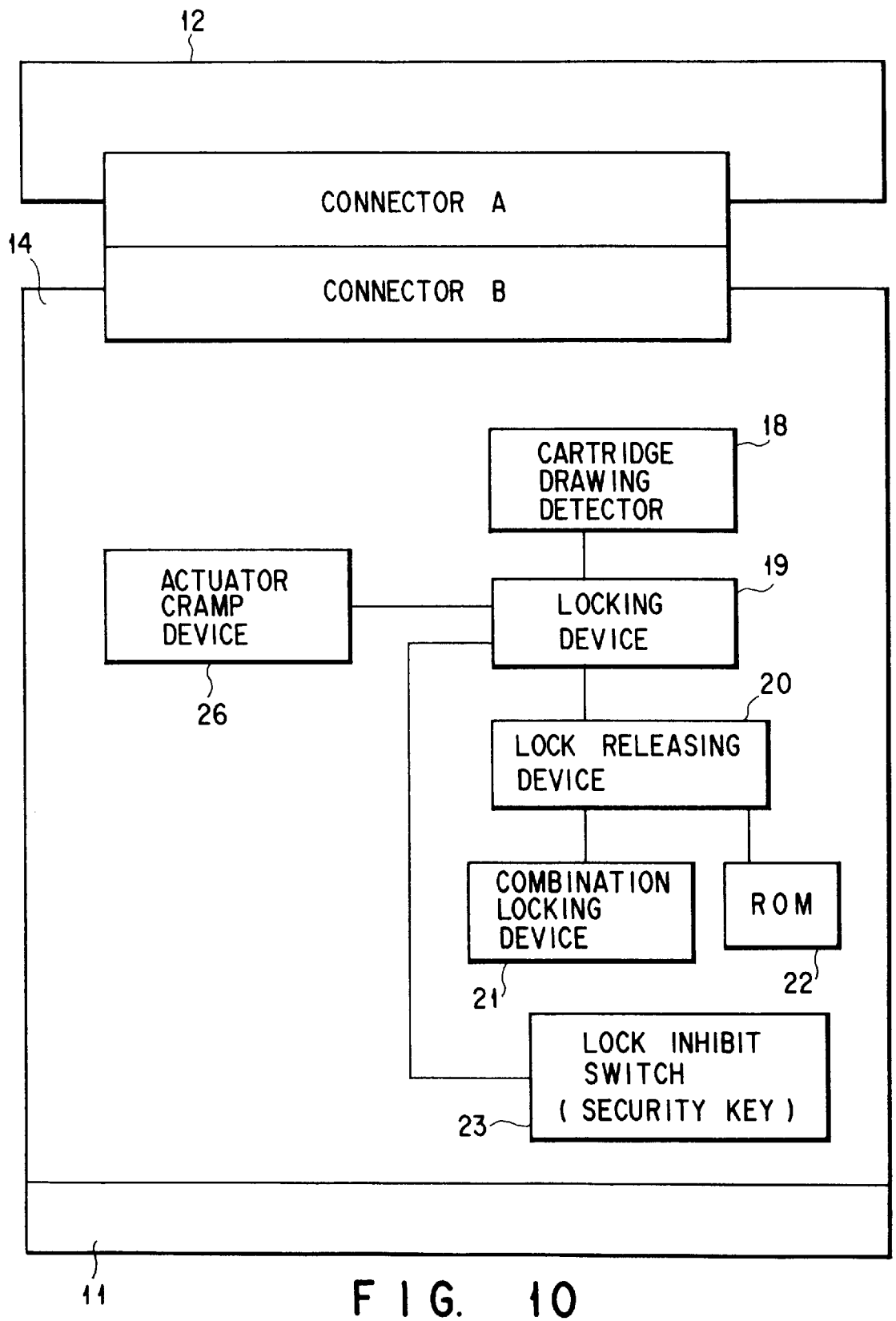
FIG. 10 is a block diagram showing a data storage apparatus according to a third embodiment of the present invention and an information equipment in which the data storage apparatus is loaded.

FIG. 10 shows a third embodiment of the present invention. According to the third embodiment, when the cartridge drawing detector 18 detects drawing of the cartridge 14, the locking device 19 for fixing an element of the HDD unit is operated. More specifically, the locking device 19 is connected to an actuator cramp device 26 so as to cramp an operation of a read/write actuator 11a (FIG. 1) of the HDD unit, thereby disabling the R/W operation. The cramping function can be executed by cutting off the connector B of the cartridge 14 (e.g., by a shutter), fixing a magnetic disk incorporated in the personal computer, or fixing the rotor of the motor. Alternatively, a head actuator mechanism can be locked by means of locking a VCM magnet or a latch mechanism of a head actuator mechanism. Particularly, in a cartridge having no R/W head, the shutter of the housing may be locked so as not to be opened or closed, or the disk itself may be fixed.

FIGS. 11A and 11B to 14A and 14B show an operation of the cartridge drawing detector 18, the locking device 19, the lock releasing device 20, the actuator cramp device 26 and the dialing key (combination lock device) 21, shown in FIG. 10. The mechanism for detecting an operation of drawing a cartridge 301 includes a cartridge 301, drive members 307 in the cartridge, a drive cramp mechanism 304 for cramping the driving members in the cartridge, a mechanism 302 for detecting a drawing of the cartridge, a switch 303 for judging an operation of the drive cramp mechanism 304 in association with the drawing of the cartridge, the dial key 21 (or a ROM), a mechanism 308 for driving the drive releasing device, and a drive releasing mechanism 306 for releasing the drive cramp mechanism 304 in association with the release of the dialing key 21. The drive members 307 in the cartridge include an actuator portion of the head, a portion for selecting a load/unload state of the head, a disk, a disk holding portion, a disk driving mechanism, a data access switch portion, a power source switch portion, and so on.

FIG. 15 is a block diagram showing an operation of the above mechanism. In the system shown in FIG. 15, in which drawing of the cartridge 301 is detected to lock the system, when the cartridge is loaded in the personal computer, the drive members 307 in the cartridge are unlocked in an operable state accessible of an information equipment as shown in FIGS. 11A and 11B. As shown in FIGS. 12A and 12B, when the cartridge 301 is drawn out of the personal computer, the mechanism 303 for operating the drive cramp mechanism 304 is operated in association with the operation of the mechanism 302, for detecting a cartridge drawing operation, arranged on the side on which the cartridge 301 is mounted. As a result, the drive cramp mechanism 304 cramps the drive members in the cartridge in an inoperable state. In this manner, when the cartridge is drawn out of the personal computer, the drive members 307 in the cartridge are always cramped in an inoperable state and locked. For this reason, the above mechanism is advantageous in that the drive members in the cartridge are prevented from a mark or damage (e.g., wear) due to an impact which the cartridge may receive while being carried. Further, when the cartridge is loaded in the personal computer, as shown in FIGS. 13A and 13B, the operation cramp is released by the drive releasing mechanism 306 by means of the dial key 21. Furthermore, as shown in FIGS. 14A and 14B, when the cartridge is loaded, the mechanism 302 for detecting a cartridge drawing operation is set in a standby state.

In the automatic locking mechanism as described above, impact detecting means may be provided before the switch 303 for operating the drive cramp device, so that the drive cramp mechanism can be operated also when the cartridge receives an impact.

According to the embodiment as described above, a data storage apparatus includes a portable cartridge incorporating a cartridge drawing detecting portion and a driving mechanism, and means for automatically inhibiting data reading or writing in association with a response from the detecting portion. In the apparatus, the inhibited state is released only by releasing the locking device. Since it is assured that the data is protected after the cartridge is drawn out, the reliability of the data storage apparatus can be increased.

In the conventional drive cramp mechanism, since the driving operation is disabled when the power source is off and enabled when the power source is on, the security of data is not assured. Further, since a conventional HDD unit, having a locking mechanism, is locked manually, the user may forget to lock the cartridge. In this case, when the cartridge is carried, the safety of the cartridge is not ensured. In contrast, the cartridge of the present invention includes the cartridge drawing detector and the locking mechanism in association with the operation of the detector. With this structure, the data stored in the cartridge is protected in terms of both security and safety.

Procedures of a locking operation of the first and second embodiments shown in FIGS. 2 and 9 will be described with reference to FIG. 16. Steps 31 to 33 are examples of an operation of cartridge drawing detection means of the present invention.

In the step 31, when the cartridge 14 of the HDD unit is drawn from the personal computer 12, the connection between the connectors A and B are cut off. As a result, a circuit power source of the HDD unit is turned off. In step 32, a power source cutoff detector detects cutoff of the power source and generates a cutoff detection signal. In step 33, a monitor for monitoring an amount of voltage fluctuation per unit time is activated in response to the cutoff detection signal, so that it is confirmed that the cutoff lasts for a predetermined period of time or longer and is not caused by a short-circuit due to contact failure or a drawing by mistake. In other words, the contact between the HDD unit and information equipment such as a personal computer is checked. For example, when a preset period of time of about 5 seconds or a desired period of time, which the user can set, is elapsed, the monitor confirms the cutoff and detects whether the security key 23 is on or off (step 34). When the security key 23 is on, a key lock operation routine 35 is started. When the security key 23 is off, a key lock operation is not performed. Therefore, when the cartridge 14 is inserted again, data can be accessed without key-lock releasing (step 36).

Figure 17:
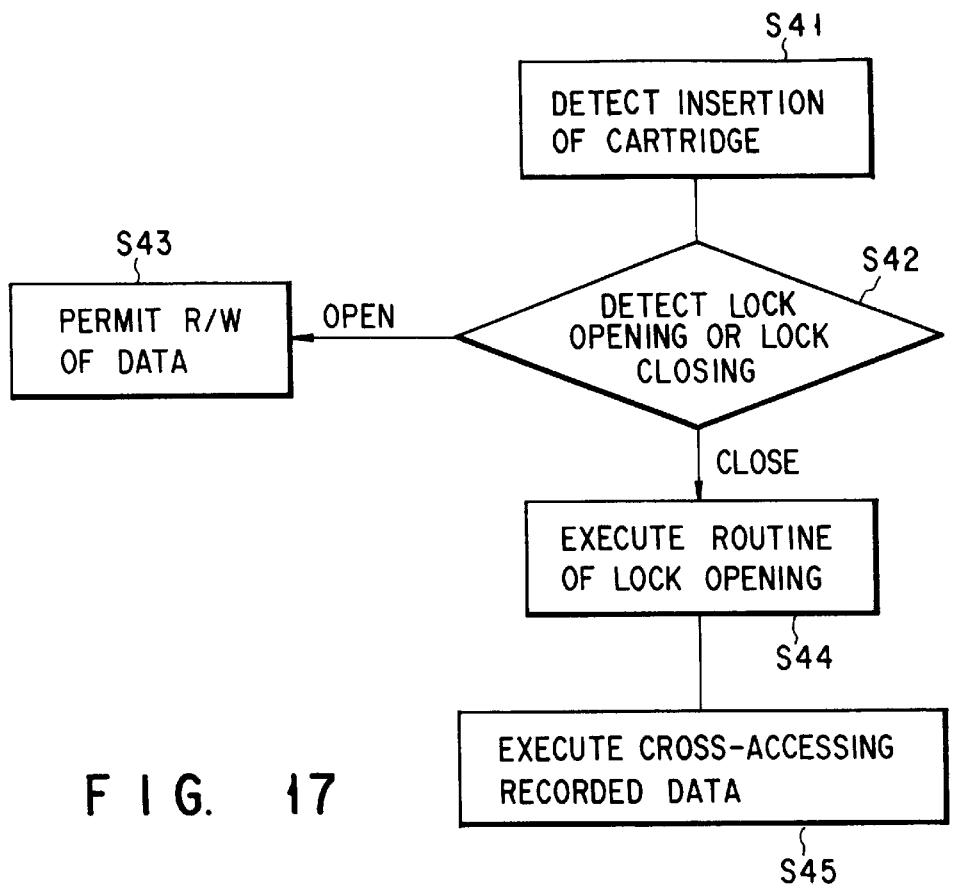
FIG. 17 is a flowchart showing a procedure of a lock-releasing operation after the insertion of the cartridge in the data storage apparatus of the first and second embodiments.

A lock releasing operation after cartridge insertion in the first and second embodiments will be described with reference to FIG. 17.

When the cartridge 14 is inserted in the main body of the information equipment, i.e., computer 12, power is supplied from the power source 24 to the circuits within the cartridge 14 and insertion of the cartridge is detected (step 41). Subsequently, whether the locking device is opened or closed is detected (step 42). Thereafter, a lock opening circuit is operable. When it is detected that the locking device is unlocked, i.e., "opened", reading and writing of data is permitted (step 43). When it is detected that the locking device is locked, i.e., "closed", the aforementioned lock releasing operation is executed, thereby "opening" the lock, so that recorded data can be accessed.

Figure 18:
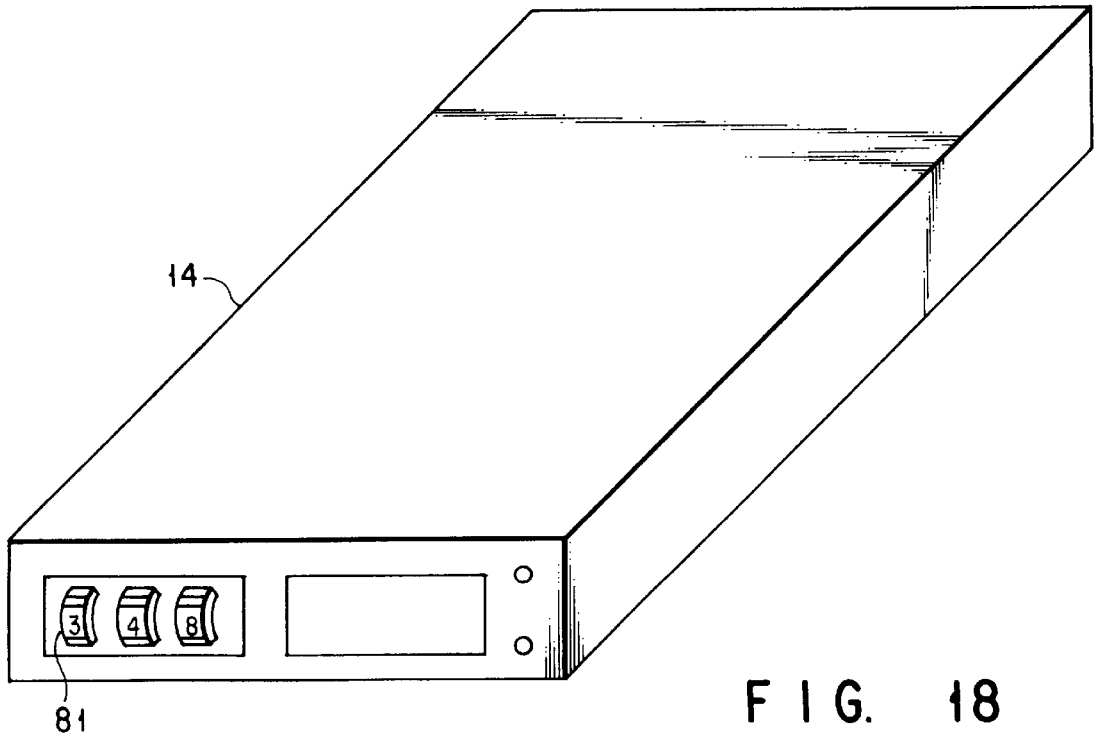
FIG. 18 is a perspective view of a cartridge of the data storage apparatus of the first embodiment.

The security key can be a dial lock as shown in FIG. 18 or a cylinder key, instead of the push button as described above. Further, it is possible to use personal data stored in the ROM of the HDD unit, for example, a code number, alphabets, a fingerprint, or a voiceprint, which can identify the user, or data which cannot easily be known to a person other than the user, and collate the data stored in the ROM with data input in the key releasing operation.

FIG. 19 is a perspective view of the cartridge 14. The cartridge shown in this drawing corresponds to a fourth embodiment, in which the dial key 21 of the first embodiment is replaced with numerical panels. The direction of the numerals is not limited to that shown in FIG. 19 but can be set to any desired direction. In the embodiment shown in FIG. 19, the security key consists of numerical touch panel keys. A touch panel 61 is located at a portion of the cartridge 14, so that it can be seen even when the cartridge is inserted in the main body of the personal computer 12. When a SET button 63 is depressed, numerals (e.g., 0 to 9) are displayed on liquid crystal surfaces or LED integrated panels of numerical touch panels, arranged in, for example, a 5×2 matrix. An input number is determined by successively depressing, for example, 5 numerals (e.g., 2, 1, 5, 5, 0) of the touch panels. When an OPEN button 62 is depressed, the input number is compared with the number prestored in the ROM. If the input number coincide with a code number (21550) stored in the ROM 22 incorporated in the cartridge 14, an electromagnetic lock, in association with the switch circuit, is released. In this case, if the lock inhibit switch (security key) 23 is on, the locking device 19 can be locked in an inhibited state when the cartridge is drawn out of the personal computer. The code number can be input through a dial key as shown in FIG. 18. Further, a cylinder key can be used instead of inputting a code number through numerical panels. Furthermore, the security can be much improved by setting the releasing mechanism as follows. For example, if the input number does not coincide with the code number three times, the cartridge is drawn out and inserted again. In this state, if ON/OFF of the power source is not detected, a number cannot be input. Even if an input number coincide with the prestored number, the locking device cannot be released.

The cartridge 14 can be constructed such that a contact of the connector (B) is covered by a connector cover or a connector shutter, thereby inhibiting connection itself. The connector cover or connector shutter covers at the same time the cartridge is drawn out of the personal computer.

However, it is not necessary that all the pins are covered by the cover or shutter. If the shutter has a waterproof structure with a packing, for covering all connector pins, a waterproof or dustproof effect can be obtained, thereby improving the data protecting performance with respect to environment. If the overall cartridge is covered by a conductive material, an electromagnetic shield effect can be obtained. If the shutter is electrically grounded together with a housing shield, the performance of protection against electrostatic breakdown can be improved.

In this embodiment, a security switch 68 is arranged on a side surface of the cartridge 14 along the inserting direction; however, it can be located on any surface of the cartridge. If the switch 68 is set to an ON side, the cartridge is automatically locked when it is drawn out. In a locked state, if the cartridge is reinserted, a LED indicator 64 indicating "LOCK" is turned on. In a lock releasing operation, if an input code number is incorrect, an ERROR indicator 67 is turned on or flickered. This indication can be made either in a lock releasing operation alone or on all occasions. The ERROR indicator can be constructed so as to be set selectively. When data is transmitted to or from the information equipment, an R/W indicator 66 is turned on. Although the above indications are executed by means of LEDs in the structure shown in FIG. 9, they can be displayed on a display device of the main body of the information equipment (personal computer) or announced by a voice or sound by means of a loud speaker of the information equipment or the cartridge.

FIG. 20 shows a state in which a memorandum is displayed on the numerical panels of the fourth embodiment. In this embodiment, the numerical touch panels are constituted by liquid crystal panels 71. A title of the cartridge (Doc-File17) and the user's name (Taro.Yama), which are input by the user, are displayed before the SET button 63 is depressed. A date, time, and a clock can also be displayed depending on setting.

The cartridge 14 has a dial key 81 as shown in FIG. 18.

In the data storage apparatus as described above, the connector of a cartridge (a cartridge pack or an IC card) incorporating a memory element, such as a data storage medium or RAM is automatically locked, by means of, for example, a shutter. As a result, a data reading/writing operation can be restricted or inhibited, so that the security of data can be maintained. The shutter mechanism protects the connector portion from dirt or dust, suppressing conductive defect, thereby providing a satisfactory electrical connection. Since the connector is protected when the cartridge is drawn out of the personal computer or the like and then carried, even if the cartridge is dropped, the connector will not receive shock, so that damage such as soldering fatigue can be prevented. As a result, the reliability of the apparatus, for example, resistance to drop can be improved. In particular, in the case of a cartridge HDD unit, with a mechanism for detecting a cartridge drawing operation and automatically locking the driving elements within the cartridge, even if the cartridge receives an impact, damage of the driving elements in the cartridge is reduced. Since dust owing to minute damage of the driving elements in the cartridge is not generated, increase of the lifetime and improvement of the reliability can be ensured.

An embodiment relating to an operation against an impact in an HDD unit non-operating time will be described with reference to FIGS. 21 to 27.

FIG. 21 shows the fifth embodiment of the present invention. An HDD unit 100, having a similar structure as that shown in FIG. 1, includes a driver 104, at least one impact acceleration detector 101 and at least one secondary battery 102. The impact acceleration detector 101 causes power to be supplied from the secondary battery 102 to the driver 104 directly or through a $\mu$ CPU 103 by an acceleration applied to the HDD unit during an HDD unit non-operating time. The secondary battery 102 arranged inside the HDD unit 100 is charged by a host side power source, i.e., a power source 105 of the personal computer, when the HDD unit is operating.

FIG. 22 shows a mechanism for supplying power from a secondary battery 114 incorporated in the HDD unit 100 to HDD circuit elements by an acceleration applied to the HDD unit 100 during an HDD unit non-operating time. Referring to FIG. 22, an end of a plate spring 111 formed of a conductive material is fixed to the cartridge of the HDD unit 100, and solenoids 112 and 113 are arranged at both sides of the plate spring 111. The solenoids 112 and 113 are respectively comprises cores 112a and 113a and coils 112b and 113b wound around the respective cores. First ends of the coils 112b and 113b are connected to a positive or negative pole of a secondary battery 114 incorporated in the HDD unit 100. Second ends of the coils 112b and 113b are respectively connected to the cores 112a and 113a. When an acceleration is externally applied to the HDD unit 100, the plate spring 110 is brought into contact with the cores 112a and 113a. When the plate spring 111 is in contact with the core 112a, a current flows from the secondary battery 114 to the coil 112b, and when the plate spring 111 is in contact with the core 113a, a current flows from the secondary battery 114 to the coil 113b. Due to the current flow through the coil 112a or 113a, the solenoid 112 or 113 serves as an electromagnet, with the result that the plate spring 111 is kept in contact with the metal core 112a or 113a, i.e., in a self holding state.

If a plurality of self holding devices as described above are arranged in the HDD unit, accelerations in a number of directions applied to the HDD unit 100 can be detected. In this case, when an acceleration is applied to the HDD unit 100 in an HDD non-operating time, power of the secondary battery 114 incorporated in the HDD unit 100 can be supplied to the driver 104. In addition, it is possible to determine, depending on the frequency characteristic of the plate spring and the distance between the metal cores 112b and 113b, the degree and the frequency component of an acceleration which causes the power of the secondary battery 114 to be supplied to the driver 104. For example, to increase the sensitivity to an acceleration externally applied to the HDD unit 100, a damping member 115 is attached to the plate spring 111, so as to obtain a frequency characteristic, from the externally applied acceleration to the displacement of the distal end of the plate spring 111, as shown in FIG. 24, and the distance between the plate spring 111 and each of the solenoids 112 and 113 is reduced. To keep the plate spring 111 in contact with the metal core 112a or 112b, it is necessary that the magnetic force generated by the coil 112b and the metal core 112a (or the coil 113b and the metal core 113a) be sufficiently greater than the force generated in the plate spring 111.

The above self holding devices may include a rotary plate spring 115, so that the power of the secondary battery 114 can be supplied to the driver 104 by an acceleration applied in a rotary direction in an HDD non-operating time. In this case, an end of the rotary plate spring 115 is fixed to the housing of the HDD unit 100 and the other end thereof is connected to a metal plate 116. When an acceleration is applied to the metal plate 116 from the outside of the HDD unit 100, the metal plate is rotated and brought into contact with two of metal cores 117a, 118a, 119a and 120a. As a result, a current flows through corresponding two of coils 117b, 118b, 119b and 120b. For example, when the metal plate 116 is brought into contact with the metal cores 117a and 119b, the metal plate 116 keeps the self holding state with respect to both the metal cores 117 and 119.

FIG. 25 shows an embodiment in which a voice coil motor is driven by power supplied from the secondary battery. In this embodiment, when an acceleration is externally applied to the HDD unit in an HDD unit non-operating time, an acceleration detector 121 as shown in FIG. 25 causes a current supplied from a secondary battery 122 to flow to a coil 123 of a voice coil motor 125, so that the voice coil motor 125 may not disengaged from a magnet latch 124. More specifically, a current is caused to flow from the secondary battery 122 to the coil 123 of the voice coil motor 125 in a direction such that the voice coil motor 125 is pressed against the magnet latch 124. As a result, the voice coil motor 125 is prevented from being disengaged from the magnet latch by an externally applied acceleration by a resultant force of magnetic force generated by the magnet latch 124 and a force generated by the voice coil motor 125 by the current flowing through the coil 123 of the voice coil motor 125.

FIG. 26 shows another embodiment for driving a voice coil motor by power supplied from the secondary battery. In this embodiment, power is supplied from a secondary battery 122 incorporated in the HDD unit 100 to a μ CPU 126. More specifically, power of the secondary battery 122 is supplied to the μ CPU 126 by an acceleration externally applied to the HDD unit 100. The acceleration moves the voice coil motor 125, with the result that the coil 123 of the voice coil motor 125 generates electromotive force. The electromotive force is converted by an A/D converter 127 to a direct current, which is input to the μ CPU 126. When the electromotive force generated by the coil 123 of the voice coil motor 125 exceeds a predetermined value, the current supplied from the second battery 122 to the coil 123 is converted to an alternate current by a D/A converter 128. The alternate current is supplied to the coil 123 via a driver 129, so that the voice coil motor 125 can be pressed against the magnet latch 124. Alternatively, the electromagnetic force generated by the coil 123 is input to the μ CPU 126 by the A/D converter 127. The value of an output from the μ CPU 126 to the D/A converter 128 is determined, depending on the magnitude of the electromagnetic force generated by the coil 123, so that the voice coil motor 125 can be pressed against the magnet latch 124.

FIG. 27 shows an embodiment including means for restricting an operation range of a load spring supporting a magnetic head, using power supplied from a secondary battery. In this embodiment, a magnetic head 132 is supported by a load spring 133 and a piezoelectric element 134 is attached to the load spring 133. When an acceleration is externally applied to the HDD unit 100 in an HDD non-operating time, a current flows through the piezoelectric element 134 by power supplied from a secondary battery 135, so that a magnetic head 132 is pressed against a magnetic disk surface 131 by the piezoelectric element 134. As a result, the magnetic head 132 is prevented from colliding with the magnetic disk surface 131 due to acceleration applied to the HDD unit. Alternatively, a current is supplied from the secondary battery 135 to the piezoelectric element 134, to separate the magnetic head 132 from the disk surface 131, so that the magnetic head 132 can be prevented from colliding with the disk surface 131, even if an acceleration is applied to the HDD unit. As a result, it is possible to prevent breakage of the magnetic head 132 and damage of the magnetic disk surface 131 due to collision between the magnetic head 132 and the magnetic disk 131.

FIG. 28 shows an embodiment including means for preventing a spindle motor from rotating by an acceleration applied to the HDD unit. A spindle motor 141 shown in FIG. 28 has three phases, nine slots and twelve poles. In this case, when a motor drive circuit 142 is fed by a secondary battery 143 incorporated in the HDD unit, it causes a current to flow through two phases (for example, from "u" phase to "v" phase) of "u", "v" and "w" phases of the stator coil of the spindle motor, thereby generating force between the magnetic field generated by the stator coil and the magnet on the rotor side, so that a static torque is generated. As a result, the spindle motor 141 is kept stationary. Therefore, even if an acceleration is applied to the inner portion of the HDD unit, the spindle motor 141 is not rotated by the acceleration.

In this embodiment, to prevent the spindle motor 141 from rotating, a current may be caused to flow through only one phase or all the three phases of the stator coil to generate a static torque.

As described above, since the spindle motor is prevented from rotating by an acceleration externally applied to the HDD unit, the magnetic disk surface is not rubbed by the magnetic head. Further, if the static torque is generated in the spindle motor 141 by supplying power from the secondary battery 143 to the spindle rotor 141 through the motor drive circuit 142, the spindle motor 141 may be rotated until the positional relationship between a stator coil and a pole of the phase through which a current from the secondary battery 143 flows has been stabilized, depending on the positional relationships between the stator coils and the poles of in the spindle motor 141 in the stopped state. For this reason, in order to completely prevent the magnetic disk surface from being rubbed by the magnetic head, a current is supplied from the secondary battery 135 to the piezoelectric element 134 attached to the load spring 133 supporting the magnetic head in the structure shown in FIG. 27, before a current from the secondary battery 143 is supplied to the spindle motor 141. As a result, the piezoelectric element 134 acts in a direction to remove the magnetic head 132 from the magnetic disk surface 131, thereby reducing the force of pressing the magnetic head 132 to the magnetic disk surface 131.

An embodiment described below includes means for storing data representing the fact that an operation for reducing an influence, on the magnetic disk, of an acceleration applied in an HDD unit non-operating time has been executed by power supplied from the secondary battery in the HDD non-operating time and informing the user of the fact.

When an acceleration is externally applied in an HDD non-operating time, data representing the fact that an operation for reducing an influence, on the magnetic disk, of an acceleration applied in an HDD unit non-operating time has been executed by power the supplied from the secondary battery in the HDD non-operating time is stored in a memory through the μ CPU driven by the power supplied from the secondary battery. When the HDD unit is driven, the data is transferred to the host side, so that the user can be informed that the power supplied from the secondary battery in the HDD unit is supplied to the HDD unit by an acceleration applied in the HDD non-operating time. Data can be transferred from the HDD unit side to the host side (personal computer side) by using, for example, an extended-command region of an IDE or SCSI interface. In the case of a removable HDD unit, when the HDD unit is inserted in a personal computer, the user can be informed by means of a sound or light, that the power is supplied from the secondary battery in the HDD unit by an acceleration applied when the HDD unit is not operating.

In the embodiment shown in FIGS. 25 to 28 as described above, an acceleration externally applied in an HDD non-operating time is detected, thereby supplying power of the secondary battery in the HDD unit to the HDD unit. Further, the power supplied from the secondary battery permits driving of the voice coil motor, restriction of the operation range of a suspension supporting the magnetic head, restriction of the rotation of a spindle motor, storing of data representing the fact that an acceleration is applied to the HDD unit when the HDD unit is not operating, and notifying the user the fact by transferring the data to the host side. As a result, resistance to vibration and impact in an HDD non-operating time can be improved.

The sixth embodiment of the present invention, having a function of giving a warning when the HDD unit receives a great impact, will be described with reference to FIGS. 29 to 32.

In the embodiment shown in FIG. 29, an HDD unit with an impact warning function comprises an HDD main body 202, an impact sensor 203 for detecting an impact and a warning signal generator 204 for generating a warning signal.

Figure 30:
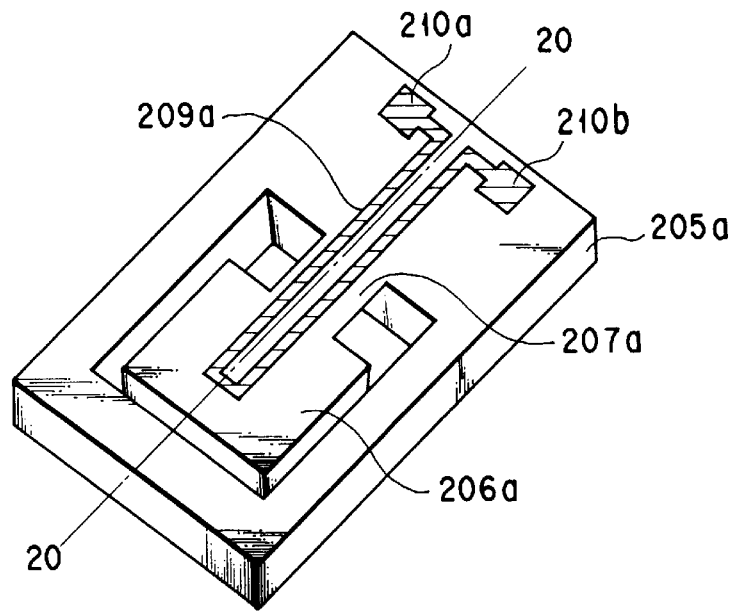
FIG. 30 is a perspective view of a shock sensor of the first example attached to the HDD unit with an impact alarm function of the sixth embodiment.
Figure 31:
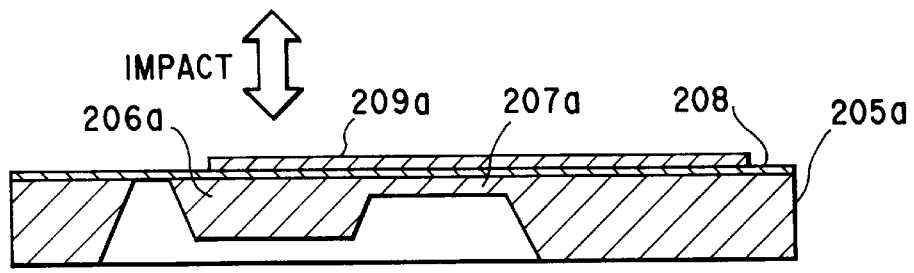
FIG. 31 is a cross-sectional view of the impact sensor, taken along the line 20—20 shown in FIG. 30.
Figure 32:
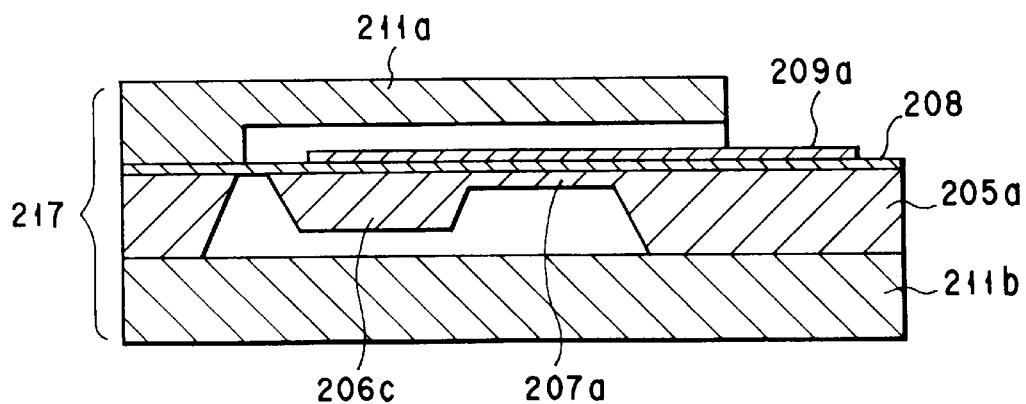
FIG. 32 is a cross-sectional view of a sensor chip corresponding to the impact sensor shown in FIG. 30.

In the impact sensor 203, as shown in FIG. 30, monocrystalline silicon is used as a structural material of a sensing element. A one-side held beam structure, in which an inertia part 206a is supported by a flexible beam 207, is formed on a silicon substrate 205a by silicon anisotropic etching. As shown in FIG. 31, an insulating layer (e.g., silicon oxide) 208 is formed on the silicon substrate 205a. A signal wire 209a and pads 210a and 210b are formed on the insulating layer 208, as shown in FIG. 30. The signal wire 209 may be a metal wire, excluding breakage, formed of aluminum (Al) or the like, and a resistor need not be connected thereto. Although the signal wire is formed on the insulating layer 208 in this embodiment, it may be a low resistance layer separated by a pn junction in a silicon matrix. As shown in FIG. 32, the silicon substrate 205a is sandwiched between cover plates 211a and 211b, thus forming a sensor chip 217. The sensor chip in this state can be incorporated in the apparatus; however, it is generally packaged first and then incorporated.

The impact sensor 203 is to detect an impact in a direction perpendicular to the silicon substrate 205a (indicated by the arrows in FIG. 31). It is designed and manufactured to such a size that the one-side held beam 207a vibrates up and down in accordance with an impact and is broken when an impact exceeding a predetermined magnitude is applied thereto (the value of an impact which breaks the beam is called a breaking impact value). Since the HDD unit 201 has a less resistance to an impact in a direction perpendicular to a recording medium, the impact sensor 203 is mounted on the unit to detect an impact in the direction. When an impact greater than the predetermined breaking impact value is applied to the sensor and the beam 207a is broken, the wire 209a formed on the beam 207a is also broken. Thus, the sensor 203 detects an impact greater than the predetermined value in a form of "breakage of the wire due to the breakage of the beam".

The sensor 203 is advantageous in that no power source is required. A sensor of the type, which requires power for a continuous operation, requires a power source, whereas the sensor of the above embodiment does not. Since the sensor of this embodiment, formed of silicon, is simple and compact, it can be mass-manufactured at a low cost.

The warning signal generator 204 detects breakage of the impact sensor 203 and generates a warning signal. Since the device 204 need be operated only when it is connected to the main apparatus, e.g., a personal computer, as will be described later, it does not require a power source. Since the sensor and the warning signal generator do not require a power source, they can be simple and manufactured at low cost.

The aforementioned HDD unit 201 can be carried freely like a conventional floppy disk and easily be loaded in and unloaded from information equipment, such as a personal computer. FIG. 33 shows an example in which the HDD unit 201 is loaded in a personal computer 212 having a display device 214. When the HDD unit 201, which has been drawn out of another personal computer, is inserted through an insertion slot 213 of the personal computer 212, the personal computer 212 accesses the HDD unit 201. At this time, the disk is not rotated immediately but the warning signal generator 204 is first operated to check whether the wire of the impact sensor is broken. The impact sensor 203 can be checked by the warning signal generator 204 as soon as the HDD unit is connected to the personal computer 212, whether or not the personal computer 212 accesses the HDD unit. If it is detected that the impact sensor 203 is not broken, the disk of the HDD 202 is rotated and the HDD 201 is normally operated. If the impact sensor 203 has been broken due to, for example, fall of the HDD unit during the carriage, the warning signal generator 204 supplies a signal for displaying a warning to the personal computer 212, so that a warning can be displayed on the display device 214 of the personal computer 212. FIG. 33 shows an example of the display in a case where the breaking impact value is set to 200G. The warning display includes a menu of subsequent processes, and the HDD unit 201 is not operated unless a suitable process is executed.

If the HDD unit 201, the interior of which has been broken, is operated, the disk storing data may probably be damaged, resulting in destruction of data. If a suitable process is executed, important data is not lost but protected and can be transferred to another disk. This advantage is significant particularly in a case where the disk has a large memory capacity. In the above embodiment, the warning is displayed on the display device 214. However, various measures can be taken for the same purpose. For example, a warning sound or a warning message voice can be generated or a warning lamp can be turned on or flickered. Further, a liquid crystal display can be incorporated in the HDD unit and a warning can be displayed thereon.

In the above embodiment, the impact sensor 203 is constituted by the one-side held beam 207a. However, it can be formed of both-side held beams 207b and 207c as shown in FIG. 34, so that both ends of an inertia part 206a are connected to a silicon substrate 205b. Alternatively, as shown in FIG. 35, an end of an inertia part 206a can be connected to a silicon substrate 205c by two or more beams 207d and 207e. In this case, a wire 209b is arranged through both the beams 207d and 207e and connected to pads 210c and 210d.

If a plurality of beams are provided, it is possible that the beams have different breaking impact values. For example, as shown in FIG. 36, two beams 207f and 207g having a breaking impact value G1 and two beams 207h and 207i having a breaking impact value G2 smaller than G1 are formed in parallel between a silicon substrate 205d and an inertia part 206d. In this case, the beams 207f and 207g having the greater breaking impact value G1 are arranged outside the beams 207h and 207i having the smaller breaking impact value G2. A wire 209c is arranged through the outer beams 207f and 207g and connected to pads 210e and 210f. A wire 209d is arranged through the inner beams 207h and 207i and connected to pads 210g and 210h.

When the impact sensor shown in FIG. 36 receives an impact, if the beams 207h and 207i having the smaller breaking impact value G2 are broken and the beams 207f and 207g having the greater breaking impact value G1 are not broken, it is understood that an impact G greater than G2 and smaller than G1 is applied to the sensor (G1>G>G2). Since the signal wires 209c and 209d are respectively formed on the beams having the different breaking impact values, as shown in FIG. 36, the degree of the impact can be detected by comparing the signals transmitted through the wires. As a result, a suitable process can be executed in accordance with the degree of the impact. The breaking impact values G1 and G2 can be set to desired values by changing, for example, the width or thickness of a beam, or the weight of the inertia part 206d.

In the embodiment shown in FIG. 36, the beams 207f, 207g, 207h and 207i having different breaking impact values are formed between one inertia part 206d and the substrate. However, as shown in FIG. 37, a plurality of one-side held beams 207j and 207k having different breaking impact values can be provided so as to connect a silicon substrate 205e and inertia parts 206e and 206f, respectively. In this case, wires 209e and 209f are respectively arranged through the beams 207j and 207k and extend to the inertia parts 206e and 206f. The ends of the respective wires 209e and 209f are connected to corresponding sets of pads 210i, 210j and 210k, 210l.

Although two one-side held beams are used in the embodiment shown in FIG. 37, it is possible to use three one-side held beams. In this case, if the beams are arranged as shown in FIG. 38, the area of the silicon substrate 205e can be reduced. More specifically, for example, four inertia parts 206g, 206h, 206i and 206j are arranged in a staggered manner in a hole portion of a silicon substrate 205f, and beams 207l, 207m, 207n and 207o, having different breaking impact values, extend besides the inertia parts 206g, 206h, 206i and 206j so as to connect the corresponding inertia parts to a silicon substrate 205r. In this case, wires 209g, 209h, 209i and 209j are respectively arranged through the beams 207l, 207m, 207n and 207o and extend to the inertia parts 206g, 206h, 206i and 206j. The ends of the respective wires are connected to corresponding sets of pads 210m, 210n; 210o, 210p; 210q, 210r; and 210s, 210t.

The impact sensor having the above constitution is mounted in the HDD unit 201, but can be exchanged easily. For example, as shown in FIG. 39, the HDD unit 201 is formed as a structure in which the four one-side held beams 207l, 207m, 207n and 207o as shown in FIG. 38 are molded within an IC package with 8 pins.

With the impact sensor shown in FIG. 38, since the pads 210m, 210n, 210o, 210p, 210q, 210r, 210s and 210t are formed on both sides of the silicon substrate 205f, the pads of the sensor chip can easily be bonded with pads of the package without crossing of wires. When a sensor is broken due to an impact, it can be exchanged with another one. The impact sensor is attached in a sensor storage section of the HDD unit 201. The storage section is normally protected by a cover but can easily be removed when the sensor is exchanged. The sensor storage section is located in a corner of the cartridge of the HDD unit 201, for example, a corner above the disk in the cartridge 14 of the HDD unit shown in FIG. 1.

In the above embodiments, the impact sensor is mounted in the HDD unit so as to detect an impact in directions perpendicular to the disk. However, a plurality of impact sensors can be mounted in the HDD unit so as to detect an impact in directions parallel to the disk or a three-dimensional impact. Further, another type of impact sensor can be used. In the above embodiments, the impact sensor is comprised of a semiconductor sensor element and a device for generating an alarm signal. However, an impact sensor, which displays various colors in accordance with impact, can be used instead. In this type of sensor, the degree of an impact is detected as a change of the color of the sensor. The color of the sensor itself thus serves to warn an impact, whereas in the above embodiments, the display device of the main apparatus such as a personal computer displays a warning. Therefore, this type of the sensor is advantageous in that the user can see whether the HDD unit has received an impact, before it is inserted in the personal computer. Further, if a sensor is of a type which detects a change in color and converts it into an electrical signal, a warning can be displayed on the main device such as a personal computer in the same manner as in the above embodiments.

In the above embodiments, the sensor and the device for generating a warning signal are constructed so as not to require a power source, so that the structure can be simple and inexpensive and, particularly in the case of a portable HDD unit, problems of a power source such as a battery can be solved. Needless to say, an impact sensor (acceleration sensor), a power source and a processor for only the impact sensor may be incorporated in the HDD unit, so that the sensor can be continuously operated to monitor an impact. In this case also, the same function as in the above embodiment can be performed.

FIG. 40 shows a seventh embodiment of the present invention. In this embodiment, an HDD unit 11 comprises a base unit 4003, a cover 4103 and a print circuit board (PCB) 4018. The base unit 4003 includes a spindle motor 4013, for rotating a magnetic disk, a magnetic head 4014 for writing/reading data in/from the magnetic disk, a head IC (integrated circuit) 4016 for processing write and read signals, and a voice coil motor 4013 for moving the head. The magnetic disk 4012 is mounted in the base unit 4003 so as to be rotatable by means of the spindle motor 4013. A packing 4101 is attached to the base unit 4003 and a packing 4001 is attached to the cover 4103 so as to face the packing 4101. The packings 4001 and 4101 improve the airtightness of the HDD unit 11.

As shown in FIG. 41, a gaseous or a solid material 4201 changeable to a liquid is sealed between the packings 4001 and 4101.

With the above structure, when the HDD cartridge is decomposed, the sealed material adheres the head to the disk, so that data cannot be written or read. As a result, the security of data is further improved. So long as the head can be adhered to the disk when the HDD cartridge is decomposed, the structure for providing the adhering function with the packings 4001 and 4101 can be substituted for another one. For example, a respiration filter 4102 can be fixed to the base unit 4003 through the cover 4103. In this case, when the HDD cartridge is decomposed, a respiration filter assembly 4105 is broken so as to scatter a material 4110 contained in the filter assembly 4105, thereby inducing a crash of the head or the disk.

Referring to FIG. 40, the magnetic disk 4012 and the spindle motor 4013 for rotating the magnetic disk are arranged on the base unit 4003. In addition, the magnetic head 4014 for recording/reproducing data in/from the magnetic disk 4012 is also arranged thereon and driven by the voice coil motor (VCM) 4017. The magnetic head 4014 and the voice coil motor 4017 are controlled by the head IC 4016. The spindle motor 4013, the voice coil motor 4017 and the magnetic head 4014 are covered by the PCB 4018 and the cover 4103 so as to supply a current to these elements. A packing 4001 is inserted between the cover 4103 and the base unit 4003. A respiration filter assembly 4015, in which a respiration film 4102 is arranged on the cover 4103 side, is mounted on the cover 4103.

According to the present invention, a device which can be electrically connected to or disconnected from, for example, a data reproducing and inputting apparatus, is mounted in a removable and portable cartridge incorporating a recording medium. When the cartridge is removed from the data inputting and reproducing apparatus, the electrical connection is automatically cutoff and locked. The electrical connection cannot be restored so as to permit reading/writing of data, until the lock is released by means of a key. With this structure, change of data reading or writing mode is restricted by means of a mechanism which can be automatically locked when the cartridge is drawn out of the data inputting and reproducing apparatus, so that it can be ensured that data is protected even after the cartridge is drawn out. As a result, a data storage apparatus of a reliable security is provided.

According to the present invention, when the magnetic disk apparatus receives an acceleration when it is not operating, it is fed by the secondary battery incorporated therein, to restrict the driving of the voice coil motor, the operation range of a gimbal supporting the magnetic head and the rotation of the spindle motor. In this manner, the influence of an impact applied to the magnetic disk apparatus during an non-operating time can be suppressed.

In addition, when the internal mechanism of the magnetic disk apparatus is broken or it receives an impact which may hinder the driving thereof, a warning is given to inform the user that the disk apparatus has received a great impact. Therefore, the user can take a necessary action to maintain the data stored in the disk apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data storage apparatus comprising:
    a cartridge having a read/write circuit, said cartridge being attachable to and detachable from an information equipment main body,
    said cartridge including:
        a detector to detect whether said cartridge is connected to the information equipment main body;
        a locking device to lock out transmission of data between the information equipment main body and said read/write circuit based on the detection by said detector of cartridge connection to the information equipment main body;
        a security key connected to said locking device to receive a security information; and
        a lock releasing device connected to said locking device to permit transmission of data only when the security information input from said security key corresponds to a preset information.

2. A data storage apparatus according to claim 1, wherein said cartridge further includes a switch provided in a power supply path extending between a power supply of the information equipment main body and said read/write circuit, for controlling the power supply path based on the state of said lock releasing device.

3. A data storage apparatus according to claim 1, wherein said lock releasing device includes a memory to store the preset information.

4. A data storage apparatus according to claim 1, wherein said security information is one selected from the group consisting of a number, an alphabet, a finger print, and a voice print.

5. The data storage apparatus of claim 1, wherein the detector comprises an extraction detecting means for detecting that the cartridge is detached from the information equipment main body, and the locking device comprises switching means provided in a power supplying path and a locking mechanism for locking the switching means in a cutoff state in response to an extraction detection.

6. The data storage apparatus of claim 5, wherein the extraction detecting means comprises a pressure sensor attached to the cartridge, and which is operated when the cartridge is detached from the information equipment main body, and supplies a lock signal to the locking mechanism.

7. The data storage apparatus of claim 5, wherein the extraction detecting means comprises a vibration sensor which is attached to the cartridge, and which detects vibration applied to the cartridge and supplies a lock signal to the locking mechanism.

8. The data storage apparatus of claim 5, wherein the extraction detecting means comprises a plurality of extraction detecting sensors which are attached to the cartridge, and which detect a mechanical change raised in the cartridge and supplies a lock signal to the locking mechanism.

9. The data storage apparatus of claim 8, wherein the extraction detecting sensors are at least one of pressure sensors and vibration sensors.

10. The data storage apparatus of claim 1, wherein the detector comprises an extraction detecting means for detecting that the cartridge is detached from the information equipment main body, and the locking device comprises switching means provided in a data transmission path and a locking mechanism for locking the switching means in a cutoff state in response to an extraction detection.

11. The data storage apparatus of claim 1, wherein the detector comprises an extraction detecting means for detecting that the cartridge is detached from the information equipment main body, and the locking device comprises cramping means for cramping an operation of locking device incorporated in the cartridge in order to inhibit data reading and writing in response to an extraction detection.

12. The data storage apparatus of claim 11, wherein the cramping means comprise means for performing at least one of cramping of the operation of a reading and writing actuator, fixing of a magnetic head incorporated in the cartridge, locking of a magnetic head driving mechanism, cramping of a disk serving as the data recording medium, and fixing of a rotor of a motor.

13. The data storage apparatus of claim 11, wherein the cramping means comprise a cutoff mechanism mounted in a cartridge and cut off in response to the extraction detection.

14. The data storage apparatus of claim 1, further comprising input means, wherein the input means comprises a dial key attached to the cartridge and operated by the user.

15. The data storage apparatus of claim 1, further comprising input means, wherein the input means comprises a touch panel, attached to the cartridge, through which data is input.

16. The data storage apparatus of claim 15, wherein the touch panel comprises a liquid crystal panel which can display input data.

17. A data storage apparatus comprising:
a cartridge having a read/write circuit, said cartridge being attachable to and detachable from an information equipment main body,
said cartridge including:
   a detector to detect whether said cartridge is connected to the information equipment main body;
   a locking device to lock out transmission of data between the information equipment main body and said read/write circuit based on the detection by said detector of cartridge connection to the information equipment main body;
   a security key connected to said locking device to receive a security information; and
   a lock releasing device connected to said locking device to permit transmission of data only when the security information input from said security key corresponds to a preset information;
   wherein said security key includes a dial key.

18. An apparatus comprising:
an information equipment and a cartridge attachable to said information equipment, said cartridge including:
   a detector detecting connection of said cartridge to the information equipment;
   a lock controlling transmission of data between the information equipment and said cartridge in response to the detection of the connection of said cartridge by said detector;
   a security key connected to the lock operative to input security information; and
   a release mechanism connected to the lock for enabling transmission of data only when the security information coincides with a preset information.

19. An apparatus according to claim 18, wherein said information equipment includes a power supply, and the cartridge further includes a switch controlling the power supply based on the state of said release mechanism.

20. An apparatus according to claim 18, wherein said release mechanism includes a data storage storing the preset information.

21. An apparatus according to claim 18, wherein said security information is one selected from the group consisting of a number, an alphabet, a finger print, and a voice print.

22. An apparatus comprising:
an information equipment and a cartridge attachable to said information equipment, said cartridge including:
   a detector detecting connection of said cartridge to the information equipment;
a lock controlling transmission of data between the information equipment and said cartridge in response to the detection of the connection of said cartridge by said detector;
   a security key connected to the lock operative to input security information; and
   a release mechanism connected to the lock for enabling transmission of data only when the security information coincides with a preset information;
   wherein said security key includes a dial key.

23. A data storage apparatus comprising:
a cartridge enclosing a read/write circuit, attachable to and detachable from an information equipment main body, said cartridge including:
   detecting means for detecting a mechanical change of said cartridge with respect to the information equipment main body;
   data inhibiting means for creating a lockout state inhibiting transmission of data between the information equipment main body and said read/write circuit in response to said detection of a mechanical change of said cartridge by said detecting means;
   data inputting means for inputting information; and
   data releasing means for releasing the lockout state only when the input information corresponds to preselected information.

24. The data storage apparatus of claim 23, wherein said data inhibiting means includes a switch provided in a power supply path extending between a power supply in the information equipment main body and said read/write circuit, and a locking device for locking said switch in said lockout state in response to detection of a mechanical change of said cartridge.

25. The data storage apparatus of claim 23, wherein said data inhibiting means includes a switch provided in a data transmission line extending between the information equipment main body and said read/write circuit and a locking device for locking said switch in said lockout state in response to detection of a mechanical change of said cartridge.

26. The data storage apparatus of claims 24 or 25, wherein said detecting means includes a data extraction detector for detecting extraction of said cartridge from the information equipment main body and transmitting an extraction detection signal to said locking device.

27. The data storage apparatus of claims 24 or 25, wherein said data releasing means includes a lock releasing device for releasing said switch from said lockout state.

28. The data storage apparatus of claim 23, wherein said data releasing means includes a memory storing said preselected information.

29. The data storage apparatus of claim 23, wherein said detecting means includes a cartridge drawing detector for detecting extraction of said cartridge from the information equipment main body, and said data inhibiting means include a cramping means for cramping operation of a read/write actuator in response to detection of cartridge extraction.

30. The data storage apparatus of claim 29, wherein said cramping means includes a mechanical cutoff apparatus for cutting off an electrical connection between said cartridge and the information equipment main body.

31. The data storage apparatus claim 23, further comprising a lock inhibit switch for preventing the data inhibiting means from operating upon said detection of a mechanical change.

32. A data storage apparatus comprising:
a cartridge enclosing a read/write circuit, attachable to and detachable from an information equipment main body;
detecting means for detecting a mechanical change of said cartridge with respect to the information equipment main body;
data inhibiting means for creating a lockout state inhibiting transmission of data between the information equipment main body and said read/write circuit in response to said detection of a mechanical change of said cartridge by said detecting means;

data inputting means for inputting information; and data releasing means for releasing the lockout state only when the input information corresponds to preselected information;

wherein said data inhibiting means includes a switch provided in a power supply path extending between a power supply in the information equipment main body and said read/write circuit, and a locking device for locking said switch in said lockout state in response to detection of a mechanical change of said cartridge; and wherein said detecting means includes a plurality of detectors for detecting a plurality of mechanical changes in said cartridge with respect to the information equipment main body and transmitting a plurality of mechanical change detection signals to said locking device.

33. A data storage apparatus comprising:

a cartridge enclosing a read/write circuit, attachable to and detachable from an information equipment main body;

detecting means for detecting a mechanical change of said cartridge with respect to the information equipment main body;

data inhibiting means for creating a lockout state inhibiting transmission of data between the information equipment main body and said read/write circuit in response to said detection of a mechanical change of said cartridge by said detecting means;

data inputting means for inputting information; and data releasing means for releasing the lockout state only when the input information corresponds to preselected information;

wherein said data inputting means includes a dial key attached to said cartridge.

34. A data storage apparatus, comprising:

a cartridge enclosing a read/write circuit, attachable to and detachable from an information equipment main body;

detecting means for detecting a mechanical change of said cartridge with respect to the information equipment main body;

data inhibiting means for creating a lockout state inhibiting transmission of data between the information equipment main body and said read/write circuit in response to said detection of a mechanical change of said cartridge by said detecting means;

data inputting means for inputting information; and data releasing means for releasing the lockout state only when the input information corresponds to preselected information;

wherein said data inhibiting means includes a switch provided in a data transmission line extending between the information equipment main body and said read/write circuit and a locking device for locking said switch in said lockout state in response to detection of a mechanical change of said cartridge; and wherein said detecting means includes a plurality of detectors for detecting a plurality of mechanical changes in said cartridge with respect to the information equipment main body and transmitting a plurality of mechanical change detection signals to said locking device.

* * * * *

UNITED STATES PATENT AND TRADEMARK OFFICE
CERTIFICATE OF CORRECTION

| | |
|---|---|
| PATENT NO. : | 5,956,194 |
| DATED : | September 21, 1999 |
| INVENTOR(S) : | Takao OHMI et al. |

It is certified that error appears in the above-identified patent and that said Letters Patent is hereby corrected as shown below:

Title Page, Item [54], in the Title, after "APPARATUS", insert
--WITH A DATA READING AND WRITING INHIBITING DEVICE--.

Claim 1, col. 19, line 54, after "apparatus", insert --,--.

Claim 17, col. 21, line 8, after "apparatus", insert --,--.

Claim 18, col. 21, line 28, after "apparatus", insert --,--.

Claim 22, col. 21, line 52, after "apparatus", insert --,--.

Claim 23, col. 22, line 1, after "apparatus", insert --,--.

Claim 31, col. 22, line 53, after "apparatus", insert --of--.

Claim 32, col. 22, line 57, after "apparatus", insert --,--.

UNITED STATES PATENT AND TRADEMARK OFFICE
CERTIFICATE OF CORRECTION

PATENT NO. : 5,956,194
DATED : September 21, 1999
INVENTOR(S) : Takao OHMI et al It is certified that error appears in the above-identified patent and that said Letters Patent is hereby corrected as shown below:

Claim 33, col. 23, line 18, after "apparatus", insert --, --.

Signed and Sealed this

Fourth Day of July, 2000

Attest:

Q. TODD DICKINSON

Attesting Officer

Director of Patents and Trademarks